(12) United States Patent
Adachi et al.

(10) Patent No.: US 8,096,663 B2
(45) Date of Patent: Jan. 17, 2012

(54) PROJECTION DISPLAY DEVICE AND STAND USED FOR THE PROJECTION DISPLAY DEVICE

(75) Inventors: Takaharu Adachi, Higashiosaka (JP); Fumihiko Hamada, Kobe (JP); So Suzuki, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 455 days.

(21) Appl. No.: 12/073,298

(22) Filed: Mar. 4, 2008

(65) Prior Publication Data

US 2008/0218707 A1    Sep. 11, 2008

(30) Foreign Application Priority Data

Mar. 6, 2007  (JP) ................................. 2007-055979
Aug. 29, 2007 (JP) ................................. 2007-222672

(51) Int. Cl.
G03B 21/28    (2006.01)
(52) U.S. Cl. ............................ 353/98; 353/119; 353/121
(58) Field of Classification Search .................... 353/72, 353/74, 76, 77, 78, 122, 98, 37, 119; 248/323, 248/284.1, 917; 348/373; 359/443, 453, 359/460
See application file for complete search history.

(56) References Cited

U.S. PATENT DOCUMENTS

| | | | |
|---|---|---|---|
| 4,156,561 A | 5/1979 | Lucas | |
| 6,412,955 B1 * | 7/2002 | Han | 353/122 |
| 2004/0160763 A1 | 8/2004 | Saito | |
| 2004/0211872 A1 * | 10/2004 | Dittmer et al. | 248/323 |
| 2004/0223123 A1 * | 11/2004 | Engle et al. | 353/69 |
| 2005/0248729 A1 | 11/2005 | Drucker et al. | |
| 2005/0264765 A1 * | 12/2005 | Yang et al. | 353/37 |
| 2006/0132727 A1 | 6/2006 | Kim et al. | |
| 2006/0132728 A1 | 6/2006 | Kim et al. | |
| 2006/0181684 A1 * | 8/2006 | Hermanson et al. | 353/31 |

FOREIGN PATENT DOCUMENTS

| | | |
|---|---|---|
| JP | 5-100312 A | 4/1993 |
| JP | 10-260473 A | 9/1998 |
| JP | 2004-252049 A | 9/2004 |
| JP | 2004-258620 A | 9/2004 |
| JP | 2006-064786 A | 3/2006 |
| JP | 2006-178468 A | 7/2006 |

OTHER PUBLICATIONS

European Search Report dated Jul. 23, 2008, issued in corresponding European Patent Application No. 08003970.
Japanese Office Action dated Sep. 20, 2011, issued in corresponding Japanese Patent Application No. 2007-222672.

* cited by examiner

*Primary Examiner* — Francis M Legasse, Jr.
(74) *Attorney, Agent, or Firm* — Westerman, Hattori, Daniels & Adrian, LLP

(57) ABSTRACT

A projection display device accommodates, in a main body cabinet, a projection lens section to which light modulated by a light modulating element is entered, and a mirror section that reflects light transmitted through the projection lens section and directs the light to a projection plane. When the main body cabinet is mounted on a mounting plane so that the light transmitted through the projection lens section may get away from the mounting plane, a holding member which holds the main body cabinet in a upright state with regard to the mounting plane is mounted on the main body cabinet.

7 Claims, 26 Drawing Sheets

CEILING MOUNT TYPE

STATIONARY TYPE

DESK MOUNT TYPE

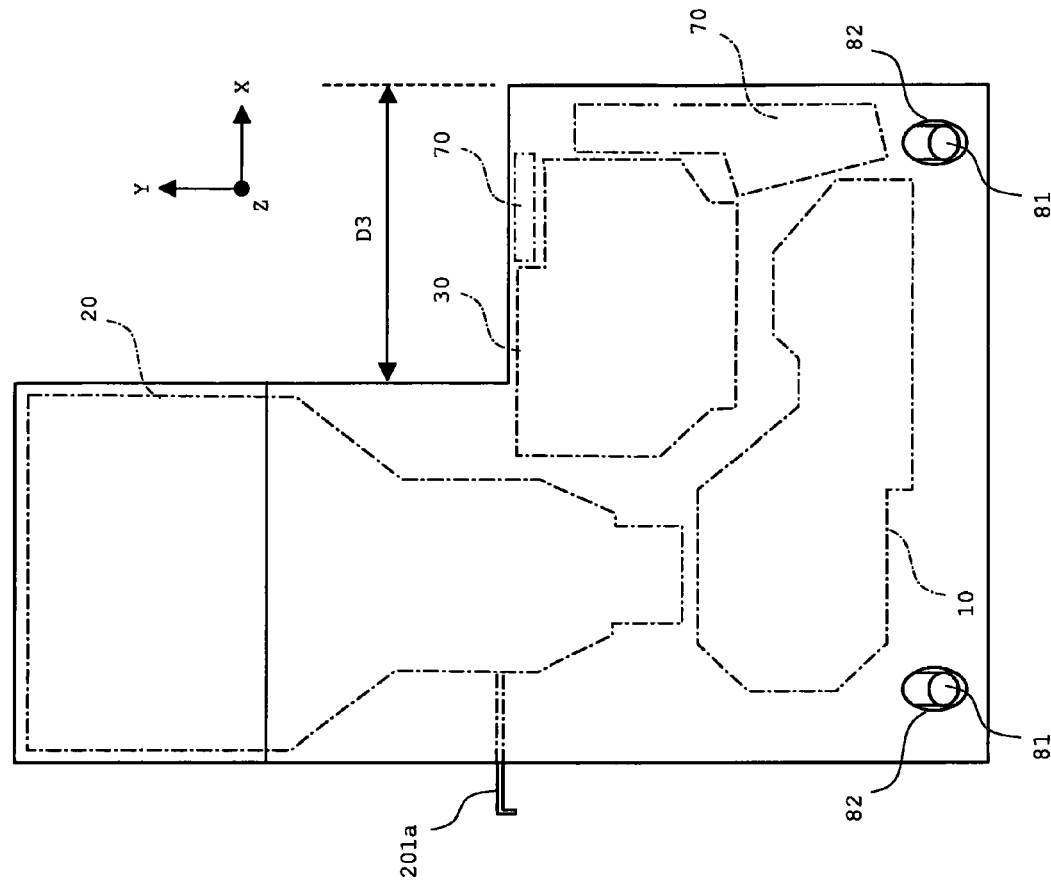
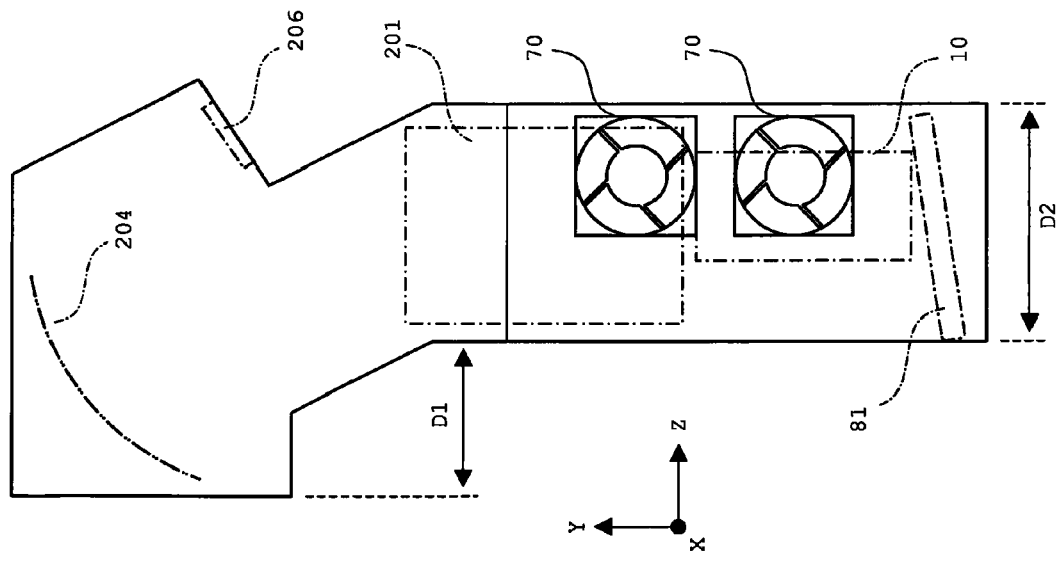

PROJECTION DISPLAY DEVICE AND STAND USED FOR THE PROJECTION DISPLAY DEVICE

This application claims priority under 35 U.S.C. Section 119 of Japanese Patent Application No. 2007-055979 filed Mar. 6, 2007, entitled "PROJECTION DISPLAY DEVICE" and Japanese Patent Application No. 2007-222672 filed Aug. 29, 2007, entitled "PROJECTION DISPLAY DEVICE AND STAND USED FOR THE PROJECTION DISPLAY DEVICE".

BACKGROUND OF THE INVENTION

1. Field of the Invention

The present invention relates to a projection display device for enlarging and projecting light modulated by a light modulating element on a projection plane and to a stand used for the projection display device.

2. Description of the Related Art

Projection display devices (hereafter, referred to as "projectors") for enlarging and projecting an image on a display element (liquid crystal panel, or the like) on a projection plane (screen, or the like) have been commercialized and widely used. In the projectors of this sort, it is desirable to reduce a distance between the screen and the projector body.

To attain this, an arrangement for oblique projection may be used in which a projection optical system is wide-angled, and at the same time, a direction of projection light traveling is oblique to an optical axis of the projection optical system. For example, when a wide-angle lens with a large view angle is used as the projection optical system, and a display element and a screen are shifted in opposite directions to each other with regard to the optical axis of the projection optical system, a projection distance is shortened, and at the same time, oblique projection without distortion can be achieved. However, with the arrangement as mentioned, a wider-angle lens with a larger view angle is necessary, and therefore, increased costs due to a large-sized lens and a large-sized projector body pose a problem.

On the other hand, for realization of the reduced projection distance, such an arrangement is also considered that a projection lens section and a mirror are used as a projection optical system, an image on a display element is formed as an intermediate image between the projection lens section and the mirror, and the intermediate image is then enlarged and projected by the mirror.

In the projectors of this sort, various states in use are expected as shown in FIG. 26. However, when a projector is used by mounting the projector on a desk top, a heavier mirror is positioned at upper part in a cabinet, resulting in a higher position of the center of gravity of the projector. For this reason, when the projector is used by mounting it on the desk, there is a danger of overturn of the projector due to application of an unwanted force. Particularly, when the projector has such an arrangement in which the mirror is disposed at a position being shifted in a direction opposite to a projection direction with regard to an optical axis of a projection lens unit, the position of the center of gravity of the projector is shifted to a side surface on a side to which the mirror is shifted in the cabinet, overturn easily occurs when a force to push a side surface on the opposite side is applied.

SUMMARY OF THE INVENTION

A projection display device according to a primary aspect of the present invention comprises a main body cabinet, a projection lens section to which light modulated by a light modulating element is entered, a mirror section for reflecting the light transmitted through the projection lens section and for directing the light to a projection plane, and a holding member for holding the main body cabinet in a upright state with regard to a mounting plane, when the main body cabinet is mounted on the mounting plane so that the light transmitted the projection lens section may get away from the mounting plane.

Furthermore, a stand used for the projection display device according to the primary aspect of the present invention is a stand used for a projection display device having a main body cabinet, a projection lens section to which light modulated by a light modulating element is entered, and a mirror section for reflecting the light transmitted through the projection lens section and for directing the light to a projection plane, the stand comprising a mounting section on which the main body cabinet is mounted, a protrusion section that projects in a lateral direction compared to a side surface of the main body cabinet mounted on the mounting section to suppress a tilt of the main body cabinet, wherein the stand is mounted on a portion facing a mounting plane of the main body cabinet to hold the main body cabinet in a upright state with regard to the mounting plane when the main body cabinet is mounted on the mounting plane so that light transmitted the projection lens section may get away from the mounting plane.

BRIEF DESCRIPTION OF THE DRAWINGS

The foregoing and other objects and novel features of the present invention will be more fully understood by reading a description of preferred embodiments below with reference to the accompanying drawings as follows:

FIG. 23A is a diagram (left side view) illustrating an example of other arrangement of the stand according to the embodiment;

FIG. 23B is a diagram (bottom plan view) illustrating the example of the other arrangement of the stand according to the embodiment;

Figure 1:
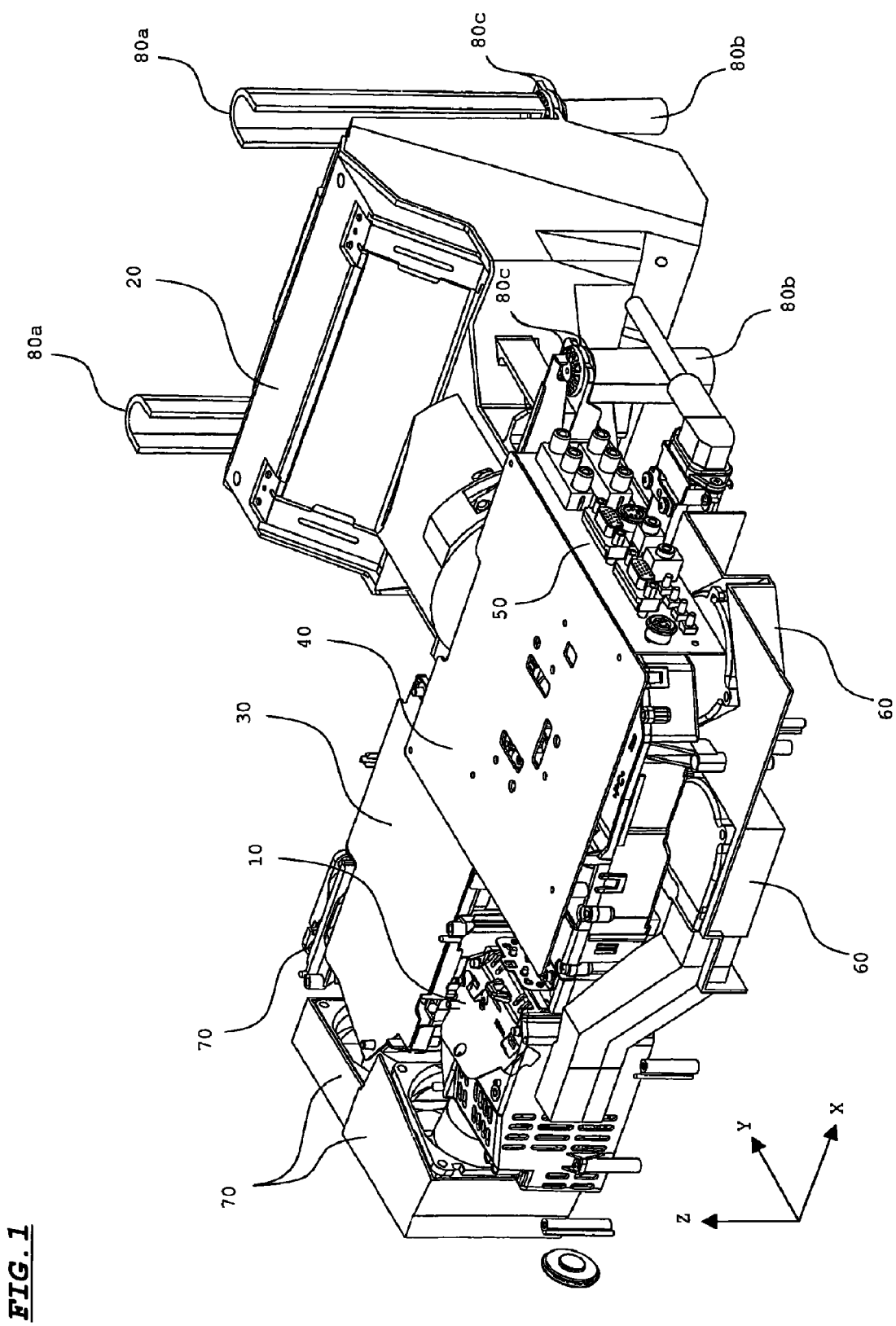
FIG. 1 is a drawing (perspective view) illustrating an arrangement of the projector according to an embodiment.

The drawings are merely intended for illustration and do not set any limits to the scope of the present invention.

DESCRIPTION OF THE PREFERRED EMBODIMENTS

Hereinafter, referring to the drawings, an arrangement of a projector according to the embodiment will be described.

Figure 8:
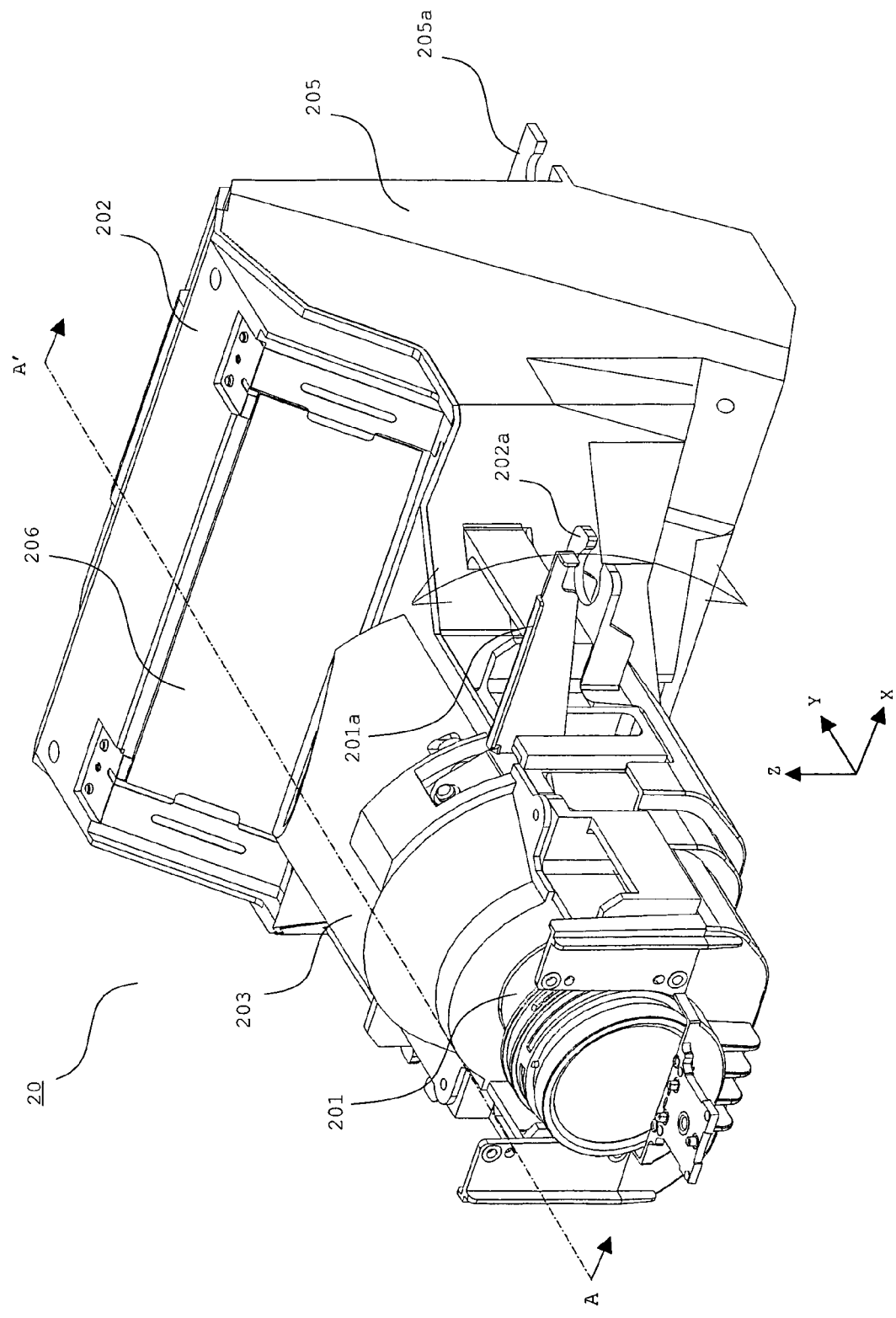
FIG. 8 is a drawing (perspective view) illustrating an arrangement of a projection optical system according to the embodiment.
Figure 9:
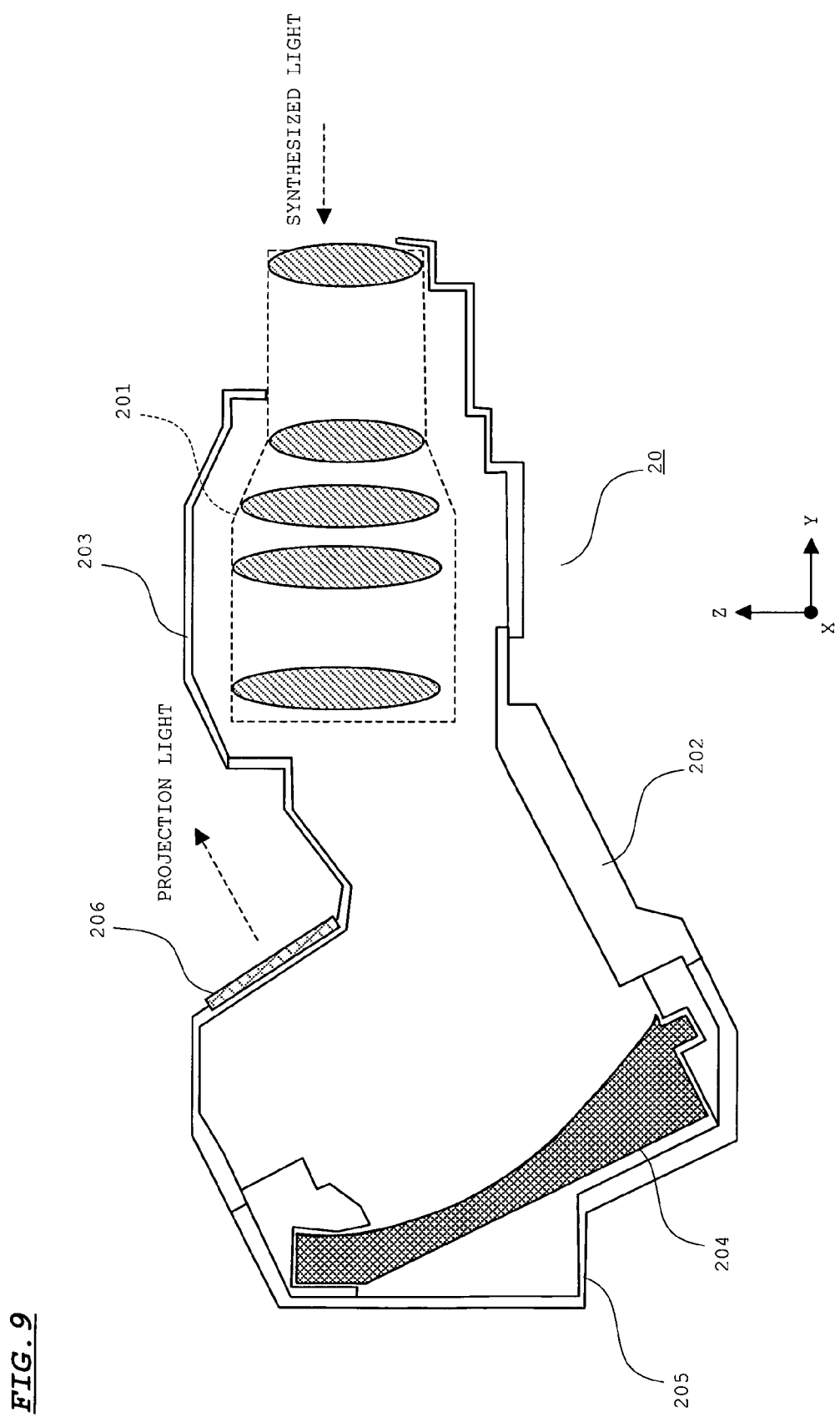
FIG. 9 is a drawing (cross-sectional view) illustrating the arrangement of the projection optical system according to the embodiment.

FIG. 1 through FIG. 7 illustrate the projector in which an external cabinet is omitted. FIG. 1 is a perspective view of the projector showing an external appearance, and FIG. 2, FIG. 3, FIG. 4, FIG. 5, FIG. 6 and FIG. 7 are respectively a top plan view, a bottom plan view, a right side view, a left side view, a front view, and a back view. FIG. 2 through FIG. 7 show the projector in a state that a main substrate 40 is removed. FIG. 8 and FIG. 9 are respectively a perspective view and a cross-sectional view (schematic view) of a projection optical system showing an external appearance.

Referring now to FIG. 1 through FIG. 7, the projector comprises an optical engine 10, a projection optical system 20, a power supply unit 30, a main substrate 40, an AV terminal section 50, a suction fan 60, an exhaust fan 70, and an AC inlet 90. Reference number 80a is a boss from a top face side of the cabinet, reference numeral 80b is a boss from a bottom face side of the cabinet, and reference numeral 80c is a bush for vibration absorption.

Figure 2:
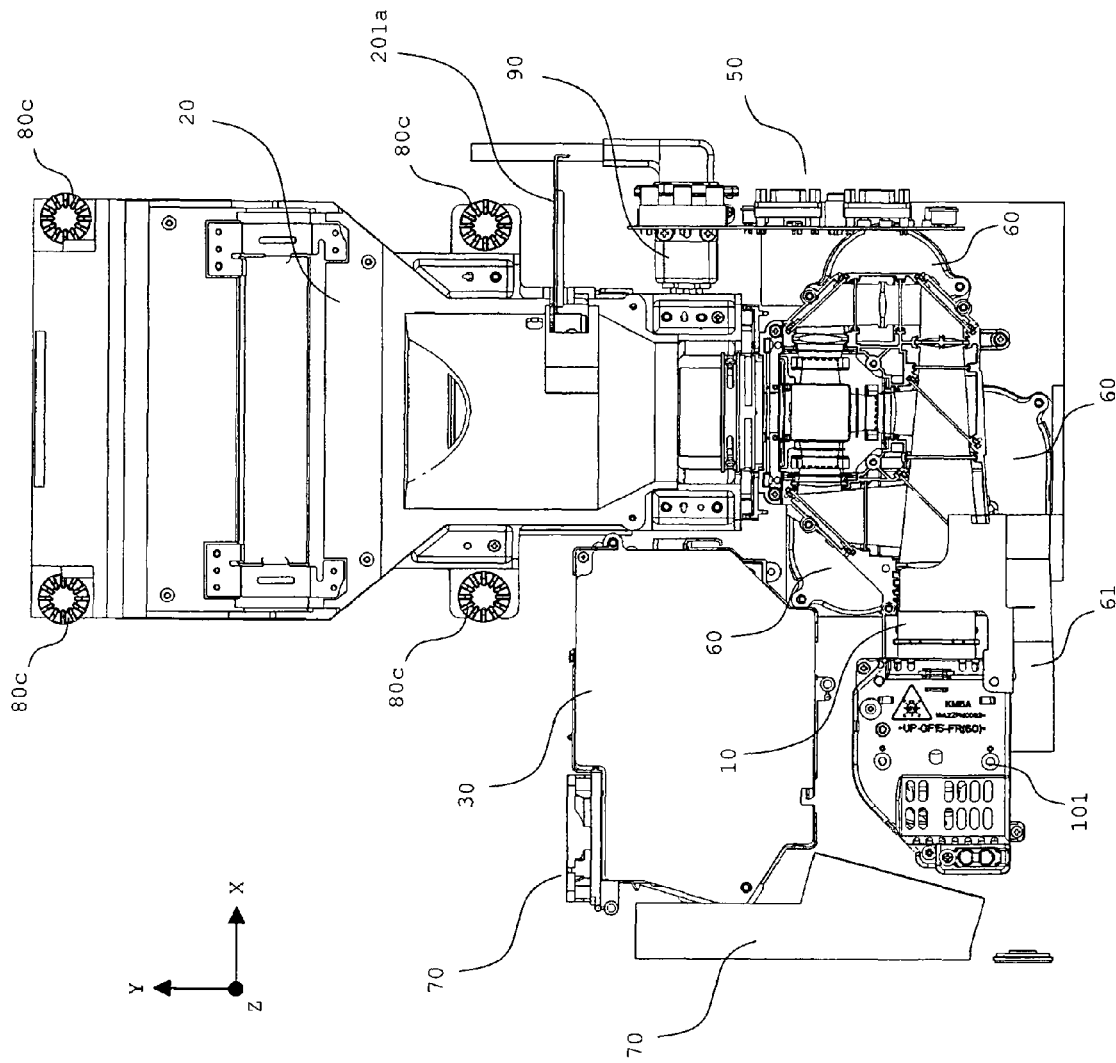
FIG. 2 is a drawing (top plan view) illustrating the arrangement of the projector according to the embodiment.
Figure 3:
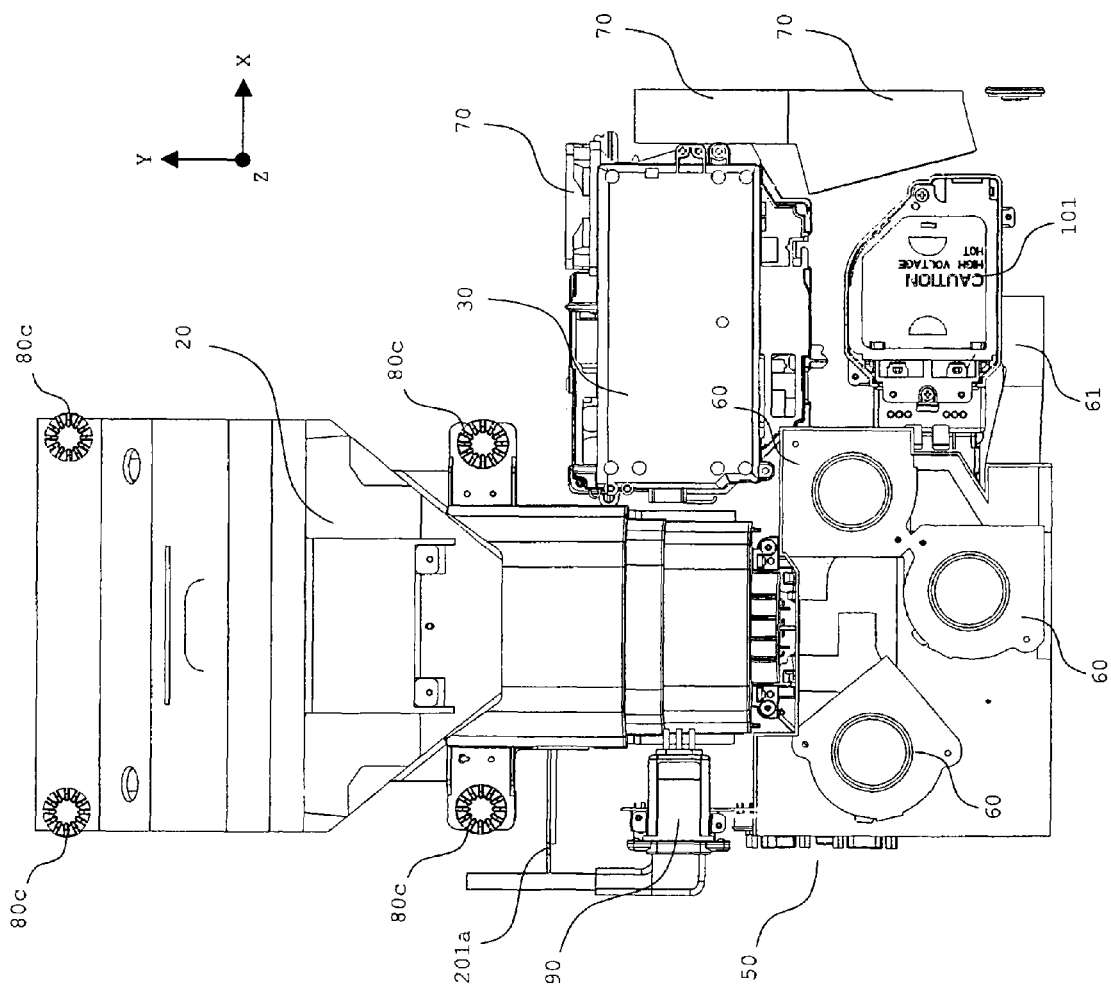
FIG. 3 is a drawing (bottom plan view) illustrating the arrangement of the projector according to the embodiment.

In the projection optical system 20, plate-like sections 202a and 205a shown in FIG. 8 are sandwiched between the bosses 80a and 80b via two bushes 80c as shown in FIG. 1, FIG. 2, and FIG. 3 to be mounted in the cabinet. Since the projection optical system 20 is sandwiched via the bush 80c for vibration absorption, shock is hardly conveyed to the projection optical system 20. The projection optical system 20 is supported by the boss 80a from the top face side of the cabinet and the boss 80b from the bottom face side of the cabinet via the bush 80c for vibration absorption, thereby improving supporting strength.

The optical engine 10 separates white light from a light source 101 into light in a blue wavelength band, light in a green wavelength band, and light in a red wavelength band, and at the same time, modulates the light in respective wavelength bands by a corresponding display element (liquid crystal panel). Furthermore, the optical engine 10 executes color synthesis of the modulated light in the respective wavelength bands by a dichroic prism, and emits the synthesized light to the projection optical system 20. As shown in FIG. 2, the light source 101 is disposed so as to illuminate the light in a direction of an X-axis. Furthermore, the projection optical system 20 is disposed so that the optical axis may be positioned in a direction of a Y-axis. An arrangement of the optical engine 10 and a positional relationship between the optical engine 10 and the projection optical system 20 will be described later, referring to FIG. 10.

The power supply unit 30 supplies electric power to the light source 101 and a main circuit 40. AC voltage is input to the power supply unit 30 via an AC inlet 90. The main circuit 40 is a circuit for driving and controlling the projector. As shown in FIG. 1, a circuit substrate for holding the main circuit 40 is disposed on the top face of the optical engine 10 to cover a part of the optical engine 10. Furthermore, an AV (Audio Visual) signal is input to the main circuit 40 via the AV terminal section 50.

Figure 5:
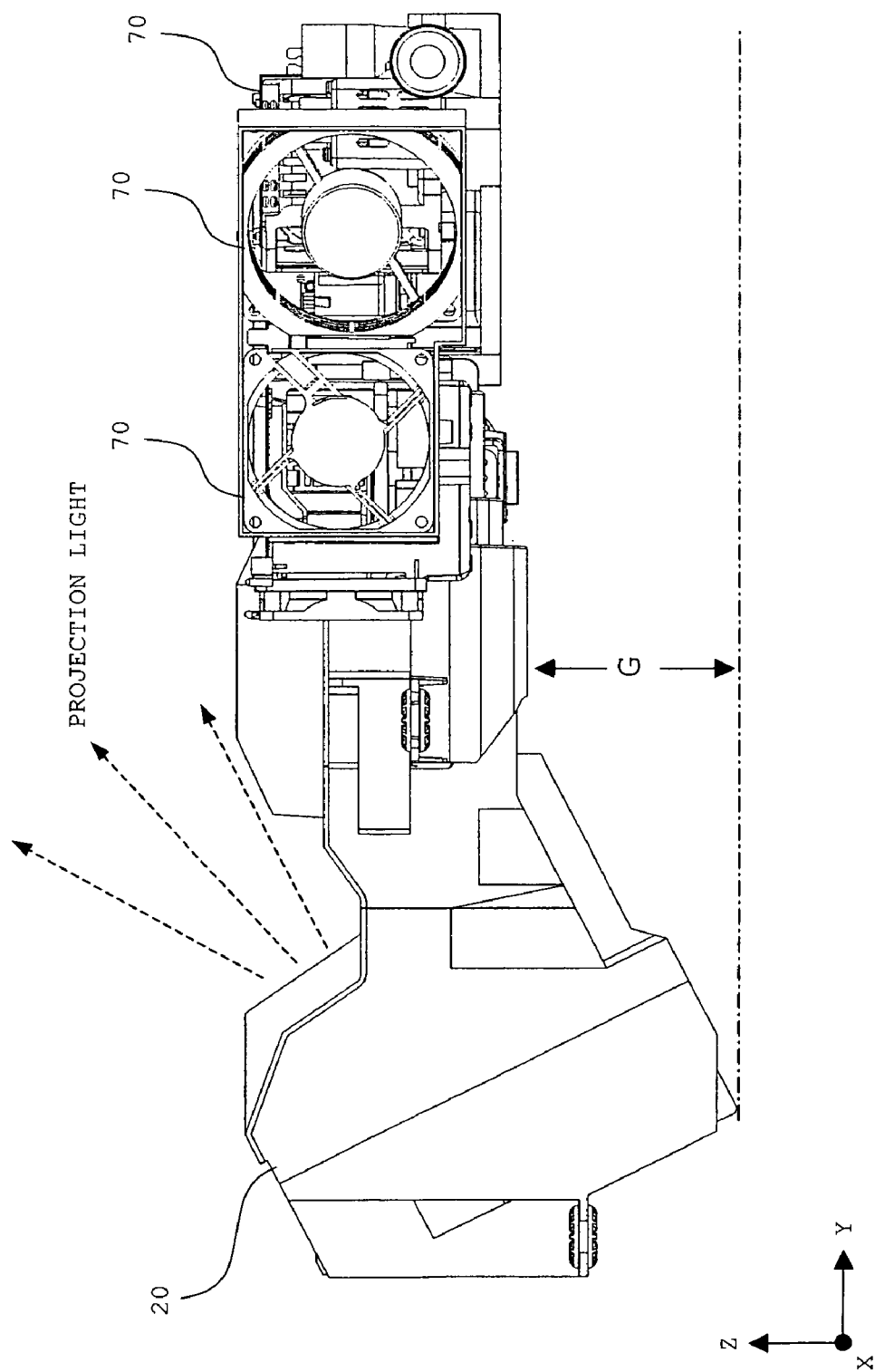
FIG. 5 is a drawing (left side view) illustrating the arrangement of the projector according to the embodiment.
Figure 6:
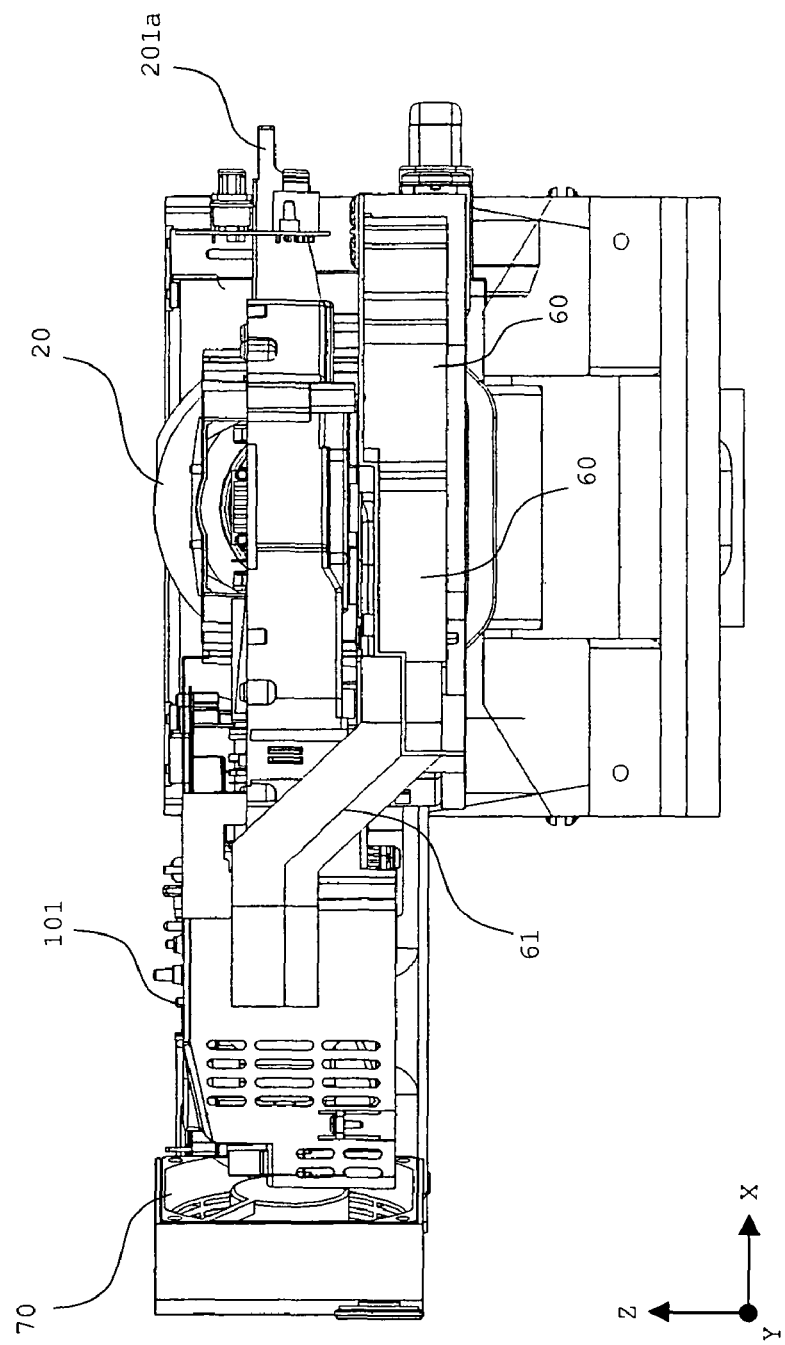
FIG. 6 is a drawing (front view) illustrating the arrangement of the projector according to the embodiment.
Figure 7:
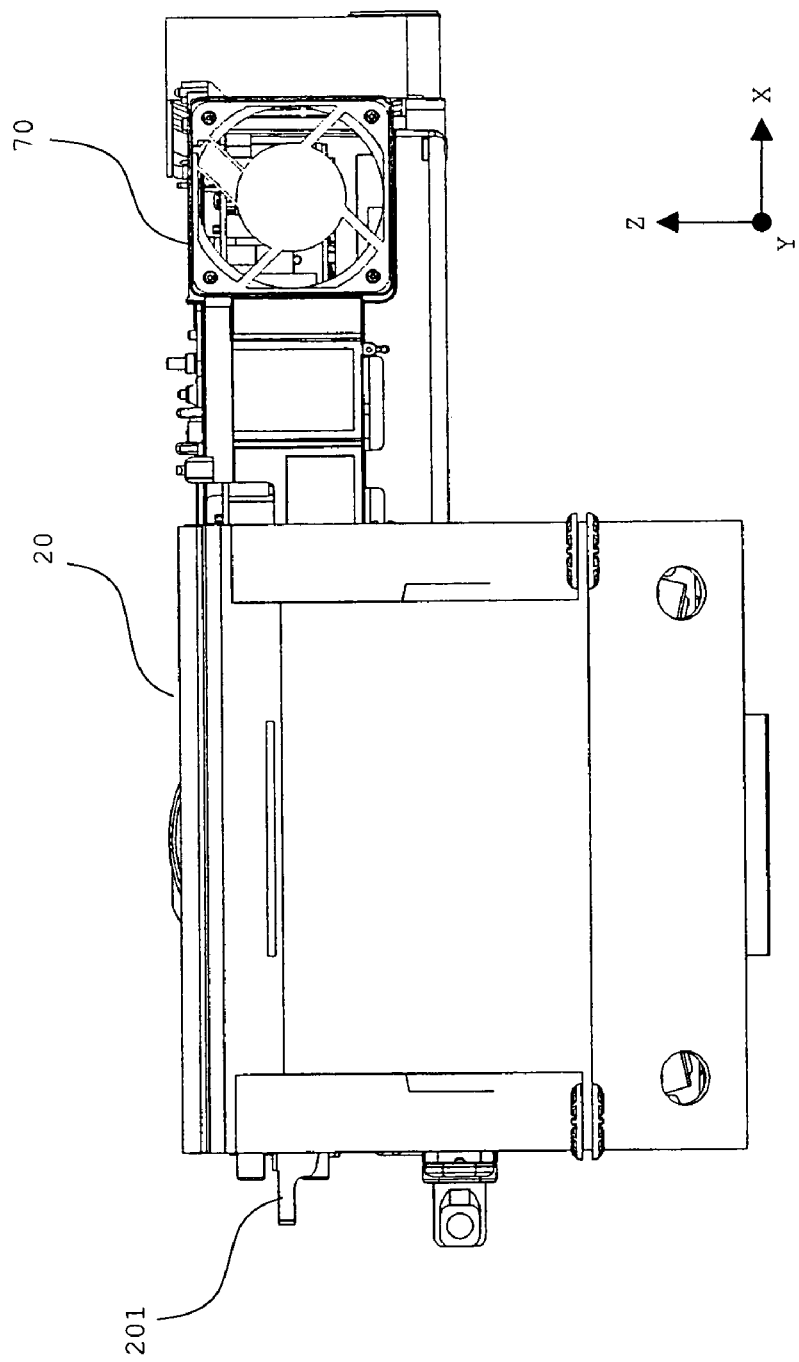
FIG. 7 is a drawing (back view) illustrating the arrangement of the projector according to the embodiment.

As shown in FIG. 1 and FIG. 3, three suction fans 60 are disposed on the bottom face side of the optical engine 10. Air sucked by these suction fans 60 is exhausted by an exhaust fan 70 (see FIG. 5) disposed on a left side surface of the optical engine 10 and an exhaust fan 70 (see FIG. 7) disposed on a rear surface of the optical engine 10. Disposition of the suction fans 60 and exhaust fans 70 as mentioned above allows the air sucked by the suction fan 60 to flow passing through an optical system of the optical engine 10, the light source 101, and the power supply unit 30. Furthermore, as shown in FIG. 2, FIG. 3, and FIG. 6, the sucked air is guided to a side surface of the light source 101 via a duct 61 and flows from the side surface of the light source 101 to the exhaust fan 70. Such air flow removes heat generated in these members.

FIG. 8 and FIG. 9 are respectively a perspective view and a cross-sectional view of the projection optical system showing the external appearance. FIG. 9 schematically illustrates an A-A' section in FIG. 8.

In FIG. 8 and FIG. 9, reference number 201 denotes a projection lens unit, reference number 202 denotes a housing, reference number 203 denotes a dust cover, reference number 204 denotes a reflection mirror, reference number 205 denotes a mirror cover, and reference number 206 denotes a light beam passing window.

The projection lens unit 201 comprises a group of lenses for image formation of the projection light onto an intermediate image formation plane, and an actuator for adjusting a focus state of the projected image by displacing a part of the group of lenses in a direction of an optical axis. Here, focus adjustment of the projection lens unit 201 is carried out by rotating a lever 201a around the optical axis of the projection lens unit 201. As shown in FIG. 8, the lever 201a is disposed to protrude from a side surface of the projection lens unit 201 without blocking the projection light from the light beam passing window 206.

The reflection mirror 204 has a reflection plane having an a spheric shape, widens an angle of the projection light entered from the projection lens unit 201, and projects it from the light beam passing window 206 to a projection plane (screen).

The projection lens unit 201 is accommodated in the housing 202, and further, is covered by the dust cover 203. The reflection mirror 204 is attached to the housing 202 and is also covered by the mirror cover 205.

As shown in FIG. 9, synthesized light generated by the optical engine 10 is entered to the projection lens unit 201 at a position spaced from the optical axis of the projection lens unit 201 in a direction of a Z-axis. The synthesized light entered as mentioned is subjected to a lens action by the projection lens unit 201 and is entered to the reflection mirror 204. Following this, the angle of the synthesized light is widened by the reflection mirror 204 and is projected on the projection plane (screen) via the light beam passing window 206.

Figure 4:
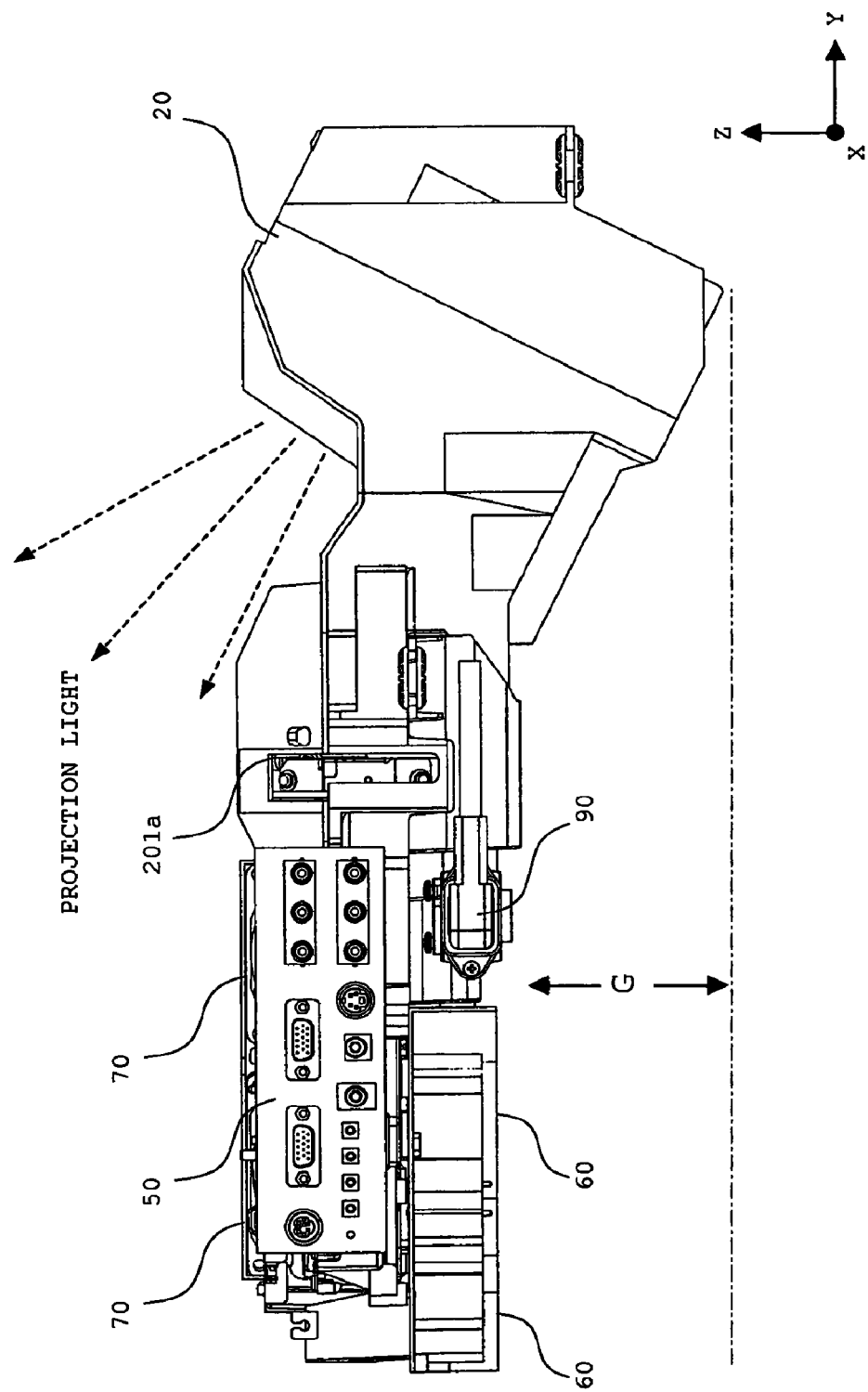
FIG. 4 is a drawing (right side view) illustrating the arrangement of the projector according to the embodiment.

As mentioned above, the synthesized light from the optical engine 10 is entered to the projection lens unit 201 at the position shifted from the optical axis of the projection lens unit 201 in the direction of the Z-axis. Therefore, the reflection mirror 204 is disposed to be shifted from the optical axis of the projection lens unit 201 in the direction opposite to the direction of the synthesized light being shifted, as shown in FIG. 9. Here, since the reflection mirror 204 has a larger reflection plane than a lens surface of each of the lenses constituting the projection lens unit 201, an amount of shifting the reflection mirror 204 with regard to the optical axis of the projection lens unit 201 becomes comparatively larger. For this reason, a comparatively large space G is created on the bottom face side of the projector as shown in FIG. 4 and FIG. 5.

Next, referring to FIG. 10, a principal arrangement of the optical engine 10 will be described.

The light source 101 comprises a burner and a reflector and emits approximately parallel light to an illumination optical system 102. The light source 101 includes, for example, an extra high pressure mercury lamp. The illumination optical system 102 comprises a fly-eye integrator, a PBS (polarization beam splitter) array and a condenser lens. The illumination optical system 102 uniformizes distribution of light quantity of the light of the respective colors when the light are entered to the display elements (liquid crystal panels) 106, 109, and 115, and arranges a direction of polarization of the light traveling to a dichroic mirror 103 in one direction. The light source 101 may be a single light type equipped with only one lamp comprising a burner and a reflector, or a multiple light type equipped with a plurality of lamps.

The dichroic mirror 103 reflects only the light in the blue wavelength band (hereafter, referred to as "B-light"), among the light entered from the illumination optical system 102, and transmits the light in the red wavelength band (hereafter, referred to as "R-light"), and the light in the green wavelength band (hereafter, referred to as "G-light"). A mirror 104 reflects the B-light reflected by the dichroic mirror 103 to a direction to a condenser lens 105.

The condenser lens 105 gives a lens action to the B-light so that the B-light is entered to the display element 106 in a state of parallel light. The display element 106 is driven in response to an image signal for a blue color and modulates the B-light in response to a driven state of the display element 106. A polarization plate (not shown) is disposed at an incident side and emitting side of the display element 106.

A dichroic mirror 107 reflects the G-light only of the R-light and G-light transmitted through the dichroic mirror 103. A condenser lens 108 gives a lens action to the G-light so that the G-light is entered to the display element 109 in a state of parallel light. The display element 109 is driven in response to an image signal for a green color and modulates the G-light in response to a driven state of the display element 109. A polarization plate (not shown) is disposed at an incident side and emitting side of the display element 109.

Relay lenses 110 and 112 give a lens action to the R-light so that an incident state of the R-light with regard to the display element 115 becomes identical with incident states of the B-light and G-light with regard to the display elements 106 and 109. Mirrors 111 and 113 change the optical path of the R-light so as to guide the R-light transmitted through the dichroic mirror 107 to the display element 115.

A condenser lens 114 gives a lens action to the R-light so that the R-light is entered to the display element 115 in a state of parallel light. The display element 115 is driven in response to an image signal for a red color and modulates the R-light in response to a driven state of the display element 115. A polarization plate (not shown) is disposed at an incident side and emitting side of the display element 115.

For the B-light, G-light, and R-light modulated by the display element 106, 109, and 115, a dichroic prism 116 reflects the B-light and R-light, and at the same time, transmits the G-light, thereby performing color synthesis of the B-light, G-light, and R-light. As mentioned above, the color synthesized light (synthesized light) is entered to the projection lens unit 201 in the projection optical system 20. Then, an angle of the synthesized light is widened by the reflection mirror 204, and the synthesized light is projected to the projection plane (screen) via the light beam passing window 206.

As illustrated, the light source 101 is disposed so that a direction of light illumination directs in a direction of the X-axis. By disposing the light source 101 in this way, the light source 101 will be positioned to illuminate the light all the time in a horizontal direction even when the projector is used as any of a ceiling mount type, a stationary type, or a desk mount type, as will be described later. Accordingly, reduction in the service life of the light source 101 due to disposition of the light source 101 in the vertical direction can be suppressed.

Figure 11:
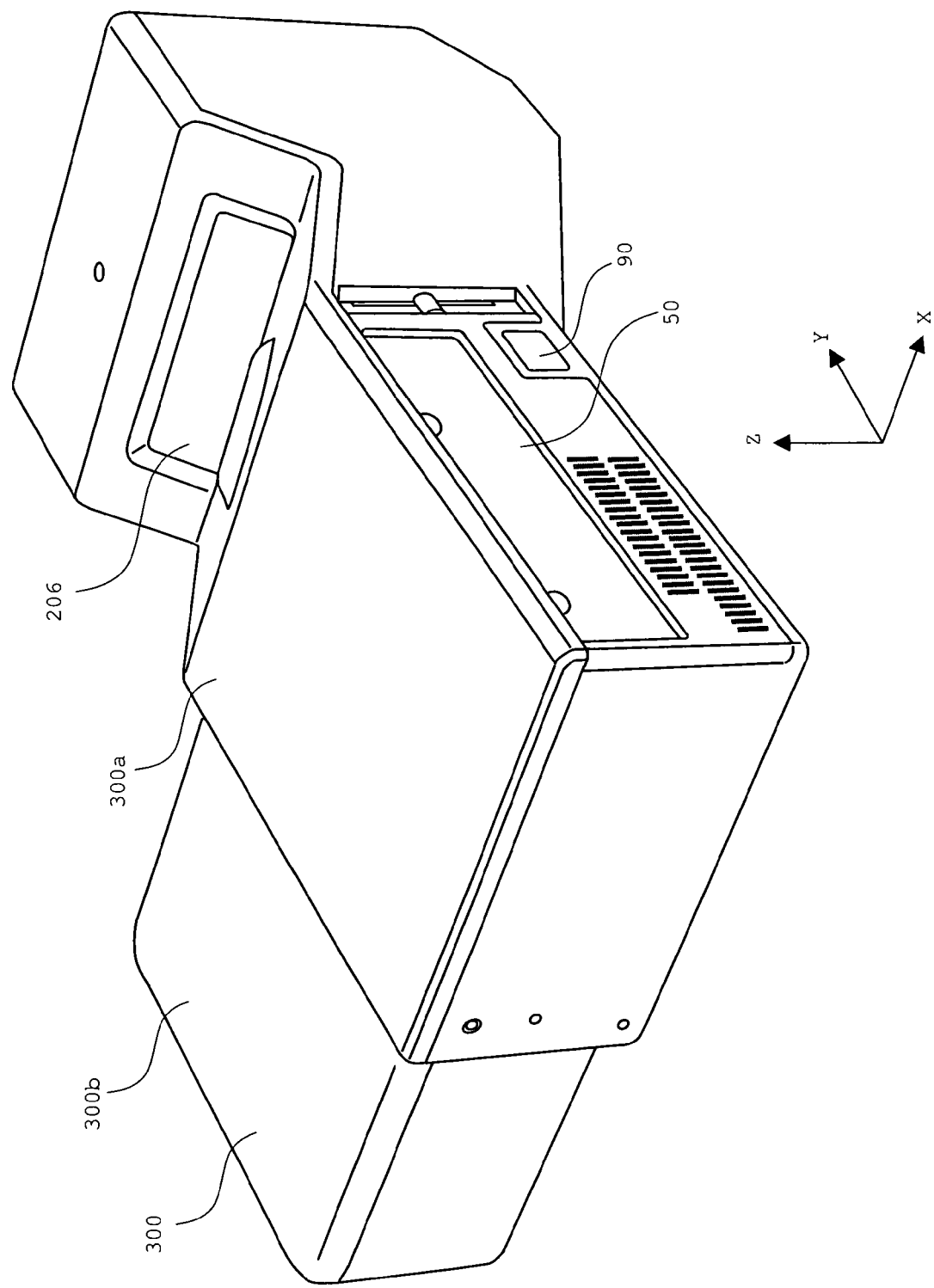
FIG. 11 is a perspective view illustrating an external arrangement of the projector according to the embodiment.
Figure 12:
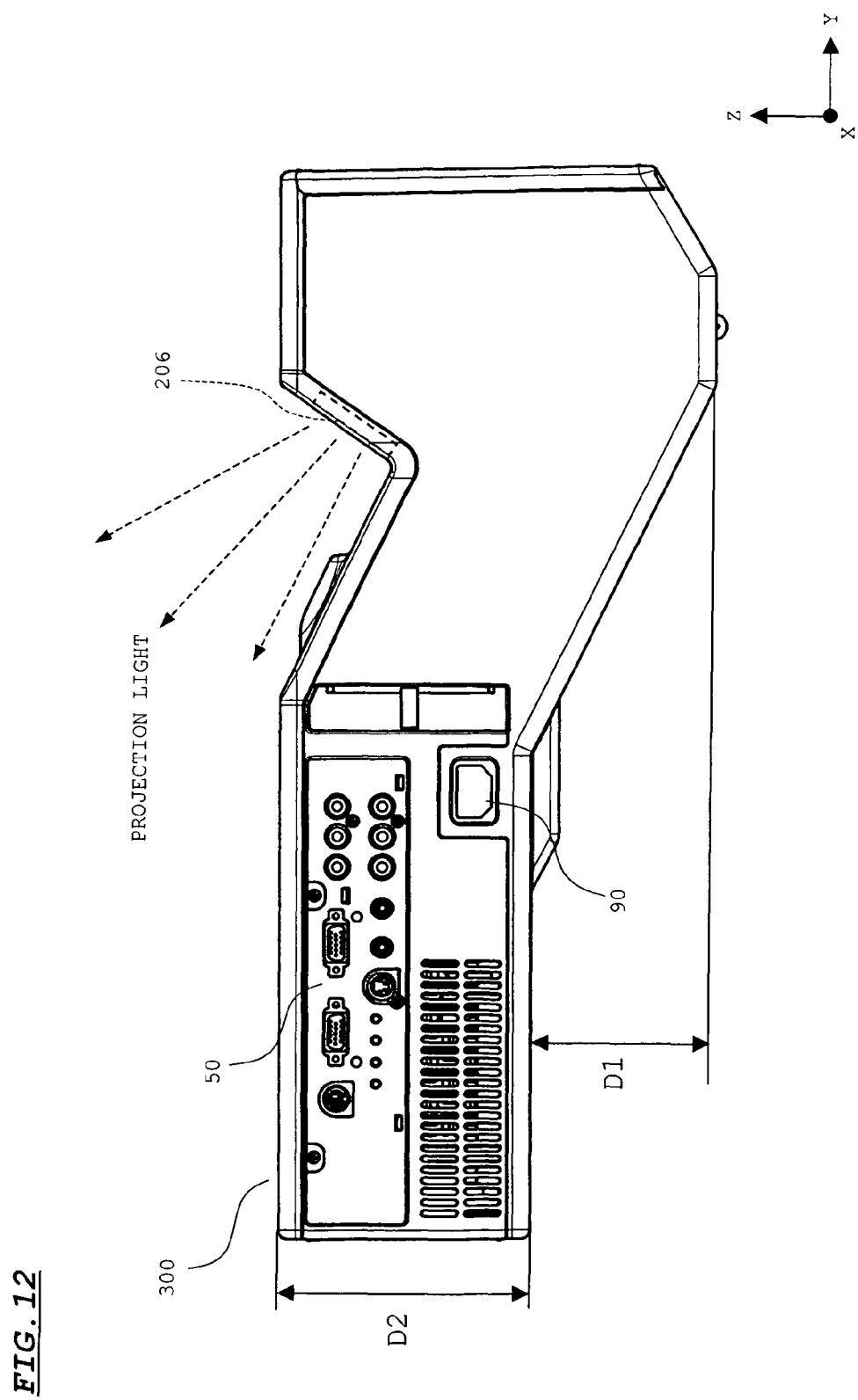
FIG. 12 is a right side view illustrating an external arrangement of the projector according to the embodiment.
Figure 13:
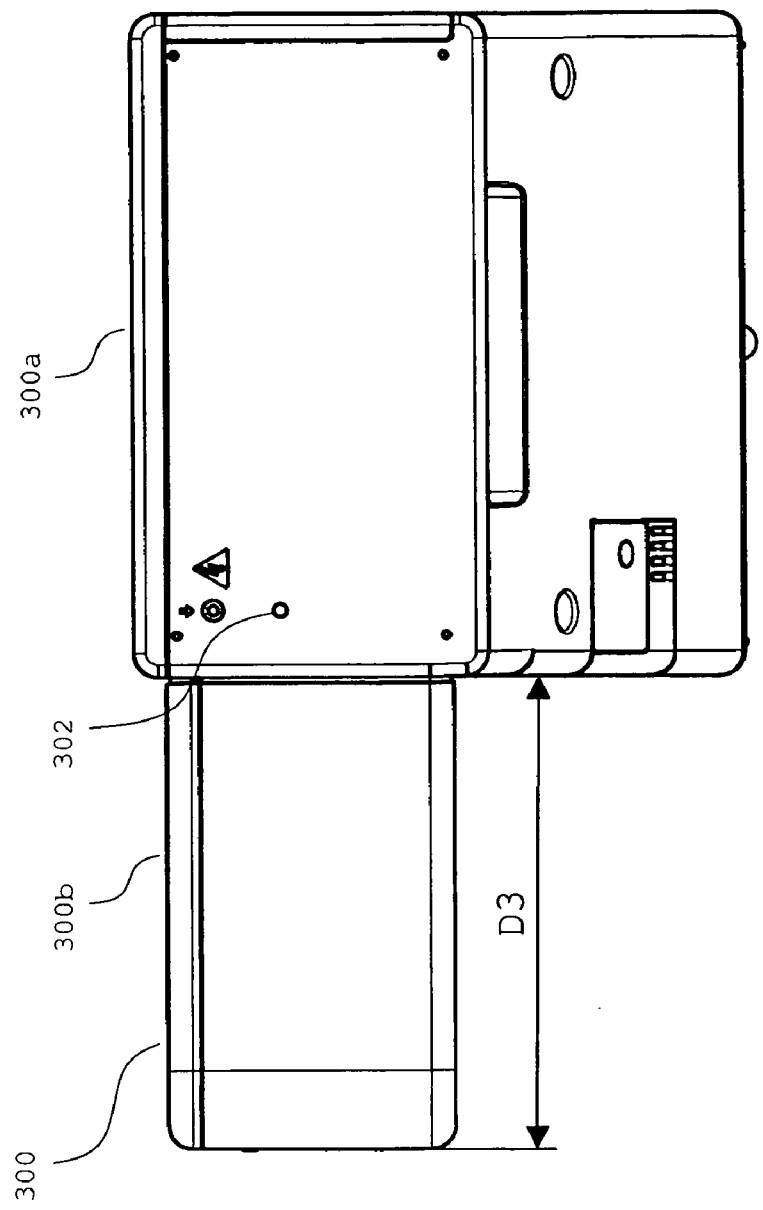
FIG. 13 is a front view illustrating an external arrangement of the projector according to the embodiment.

FIG. 11 is a perspective view illustrating an external arrangement of the projector in a case where the internal structure of the projector shown in FIG. 1 is accommodated in the cabinet. FIG. 12 and FIG. 13 are respectively a right side view and a front view of the projector.

As mentioned above, in the projector according to the present embodiment, the reflection mirror 204 is disposed to be shifted from the optical axis of the projection lens unit 201 in the direction opposite to the direction of shifting the synthesized light, and therefore, as shown in FIG. 12, the housing 202 of the cabinet 300 and the mirror cover 205 portion are protruded by D1 in a direction of a Z-axis. Furthermore, since the light source 101 is disposed so that the optical axis of the light source 101 intersects orthogonal to the optical axis of the projection lens unit 201, as shown in FIG. 13, a portion of the light source 101 (protrusion side cabinet 300b) is protruded from the main body part (main body side cabinet 300a) by D3 in a direction of an X-axis.

Each of terminals of the AV terminal section 50 and the AC inlet 90 are disposed on right side surface of the cabinet 300. In other words, neither the terminals nor the AC inlet is disposed on a front face of the main body side cabinet 300a, and the front face of the main body side cabinet 300a has a flat plane. Accordingly, the front face of the main body side cabinet 300a may be fixed to the stand 400 for desk mounting, as will be described later.

Figure 14A:
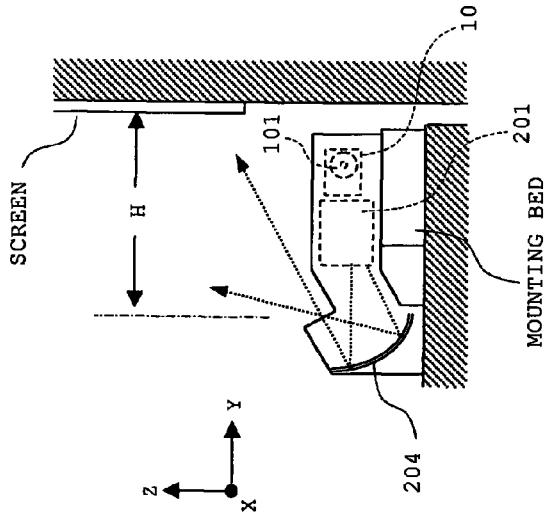
FIG. 14A is a diagram illustrating a state in use (ceiling mount type) of the projector according to the embodiment.
Figure 14B:
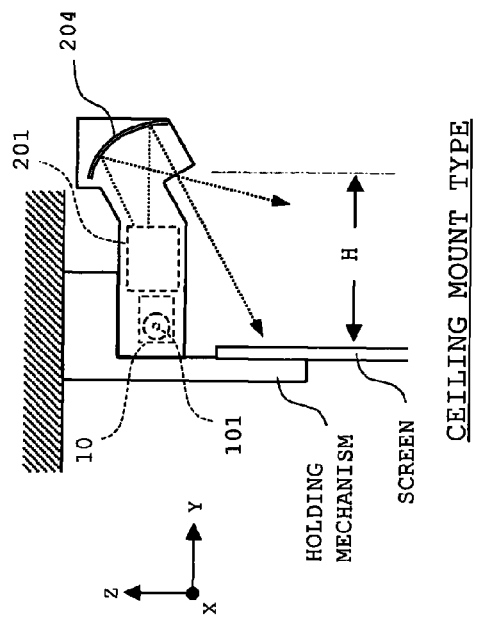
FIG. 14B is a diagram illustrating a state in use (stationary type) of the projector according to the embodiment.
Figure 14C:
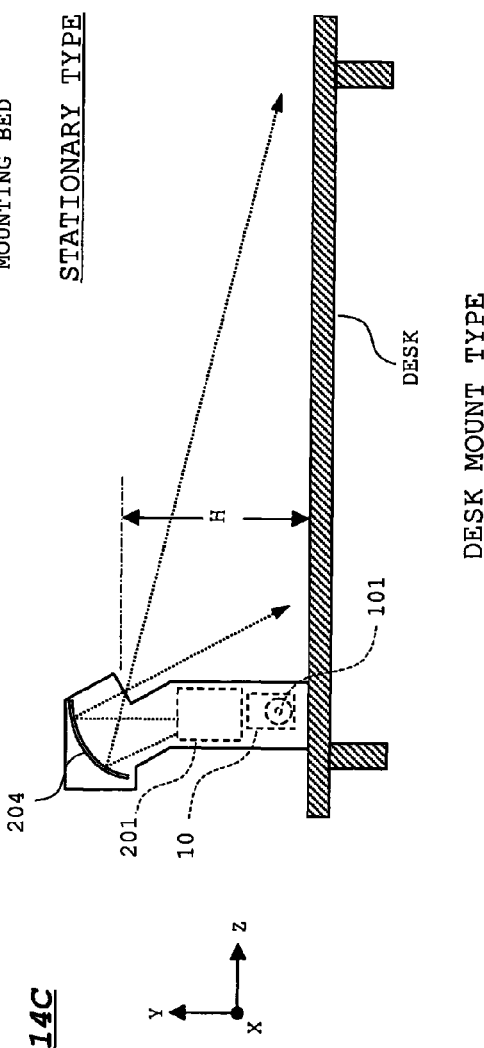
FIG. 14C is a diagram illustrating a state in use (desk mount type) of the projector according to the embodiment.

FIG. 14 is a diagram illustrating a state in use of the projector according to the present embodiment. As illustrated, according to the present embodiment, the light source 101 is positioned so as to be directed in the horizontal direction even when the projector is mounted by desk mount type as well as ceiling mount type and stationary type. That is, according to the present embodiment, by disposing the light source 101 in the optical engine 10 so that light from the light source 101 may be directed in the direction of the X-axis in FIG. 2, the light source 101 is directed in the horizontal direction all the time in any of state in use of ceiling mount type, stationary type, and desk mount type. For this reason, according to the present embodiment, reduction in the service life of the light source 101 due to disposition of the light source 101 in the vertical direction can be suppressed.

Figure 10:
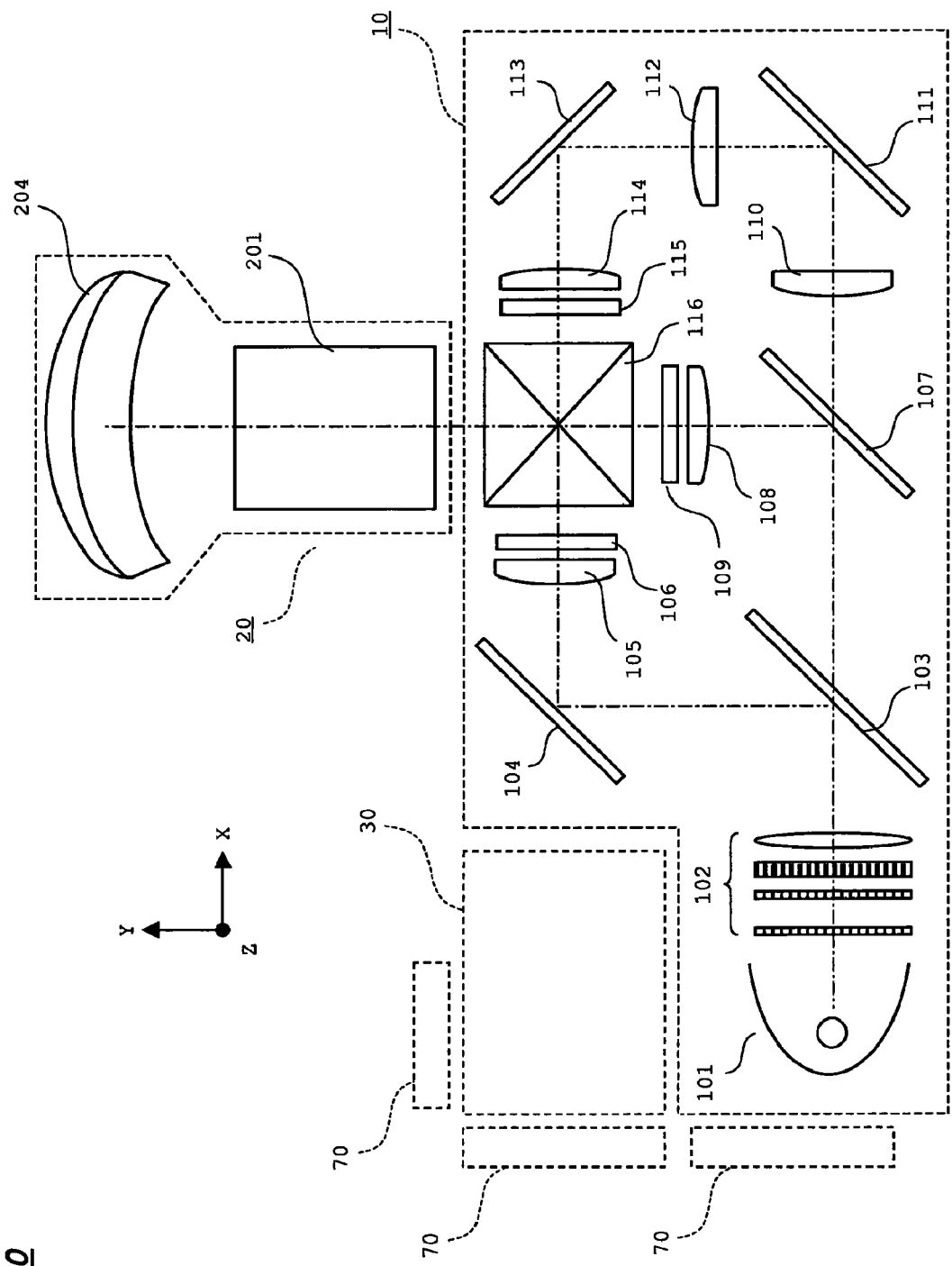
FIG. 10 is a drawing illustrating an arrangement of an optical engine according to the embodiment.

Furthermore, according to the present embodiment, as shown in FIG. 2 and FIG. 10, since the light source 101 is disposed so that the optical axis of the light source 101 intersects orthogonal to the optical axis of the projection lens unit 201, a dimension of the optical engine 10 in the optical axis direction of the projection lens unit 201 can be suppressed. Therefore, according to the present embodiment, a projection distance H shown in FIG. 14 can be made shorter, and as a result, possibilities that before reaching the screen, the light emitted from the light beam passing window 206 is blocked by obstacles can be reduced.

Figure 15:
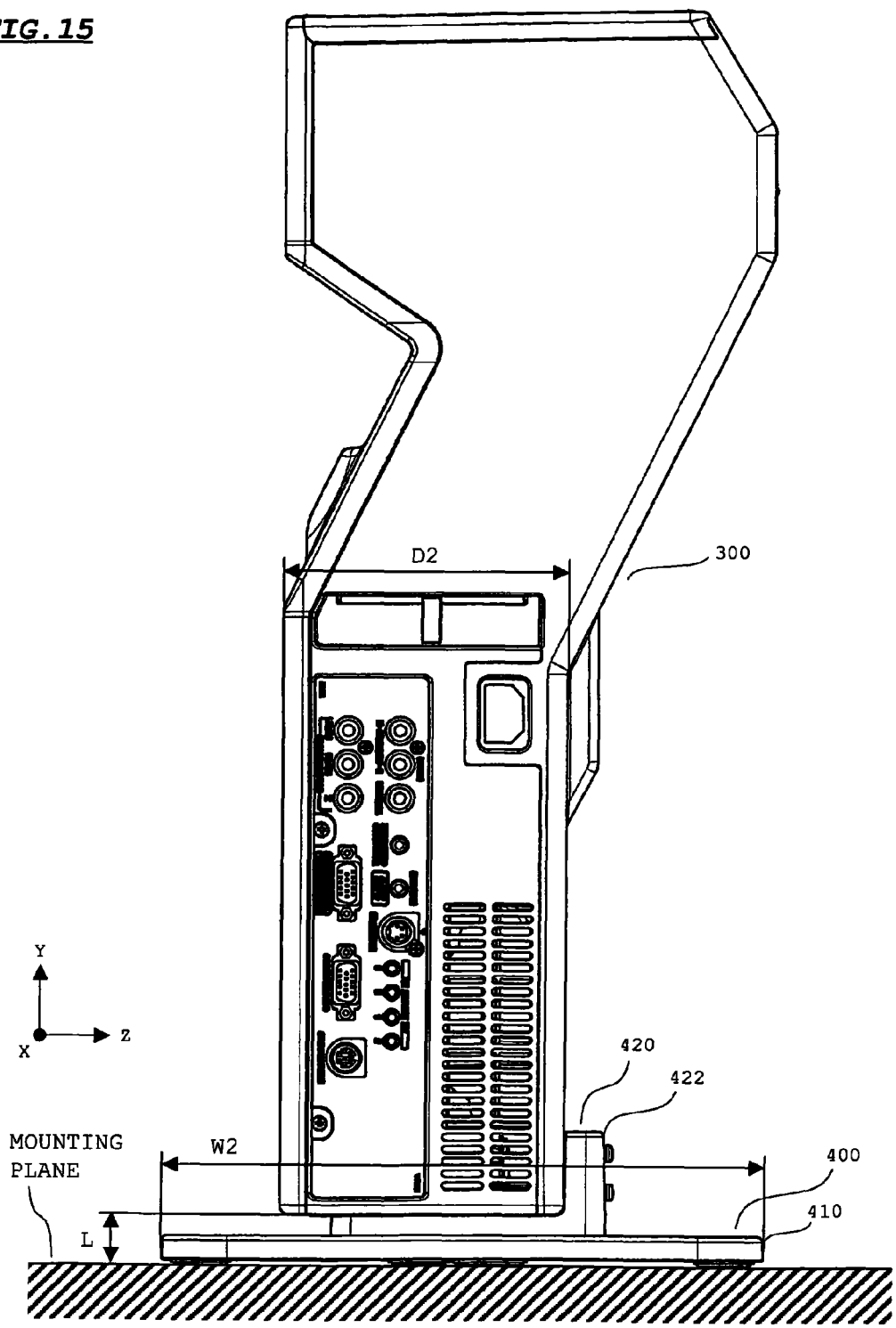
FIG. 15 is a right side view illustrating an external appearance of the projector equipped with a stand according to the embodiment.
Figure 16:
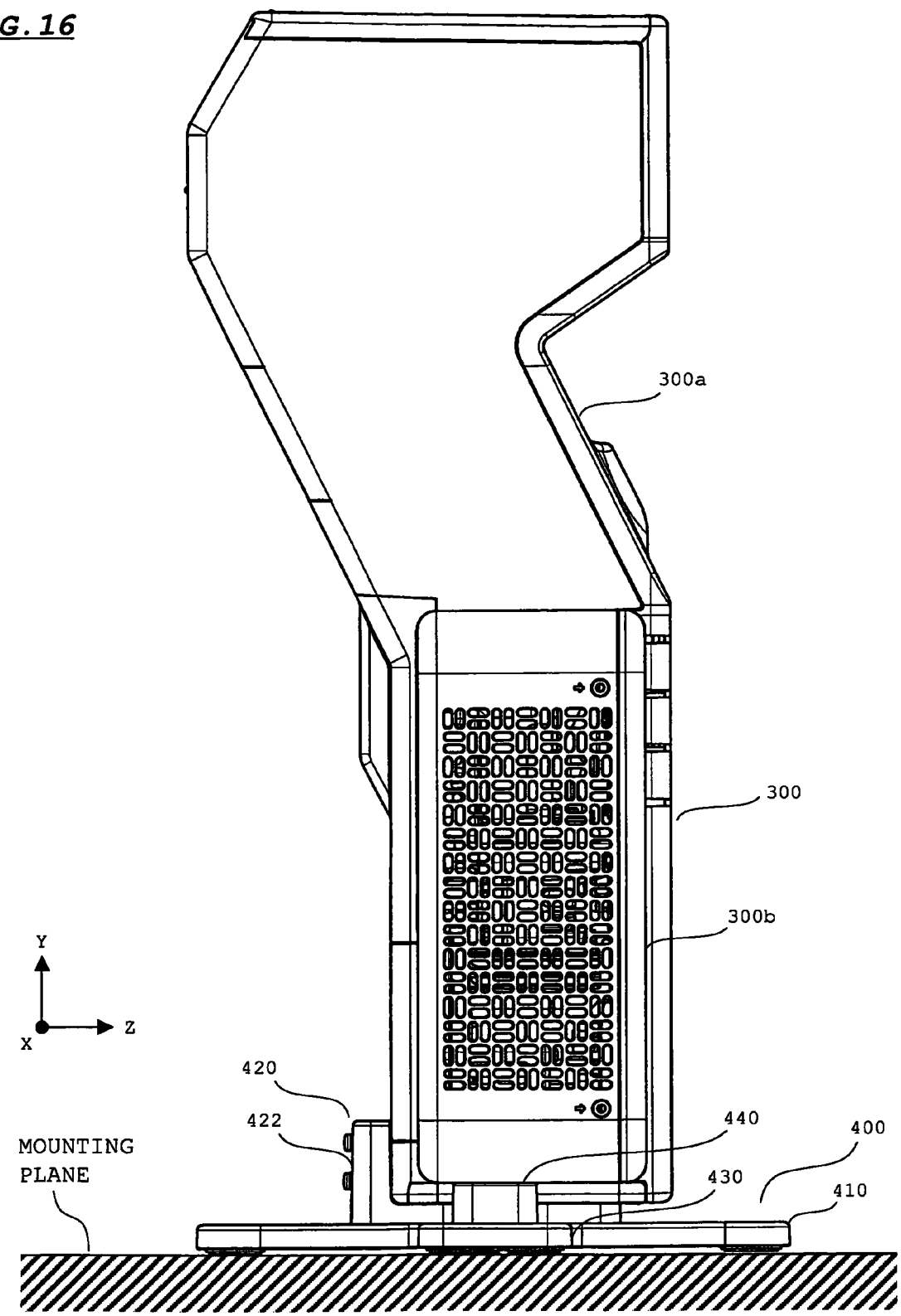
FIG. 16 is a left side view illustrating the external appearance of the projector equipped with the stand according to the embodiment.
Figure 17:
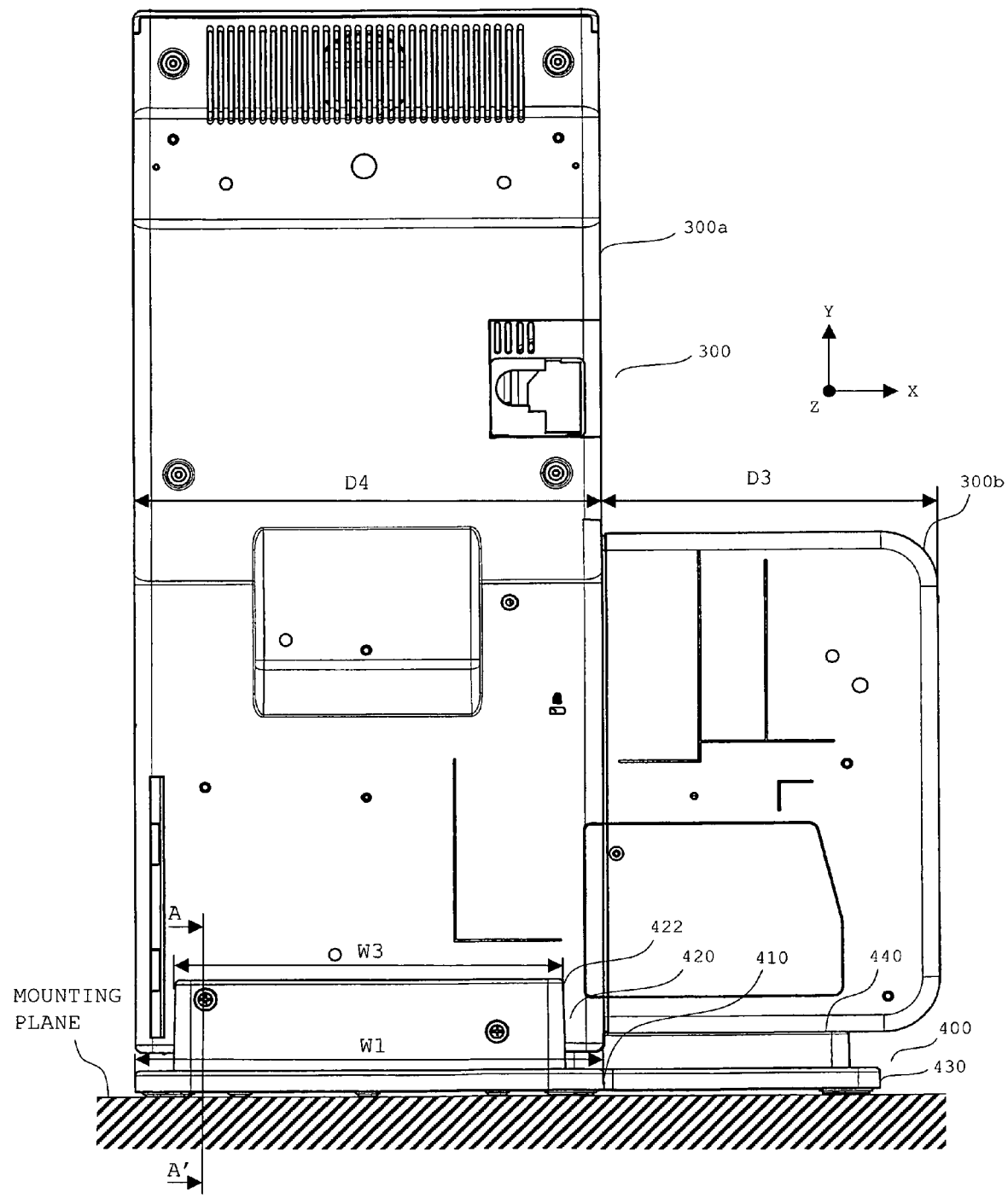
FIG. 17 is a bottom plan view illustrating the external appearance of the projector equipped with the stand according to the embodiment.
Figure 18:
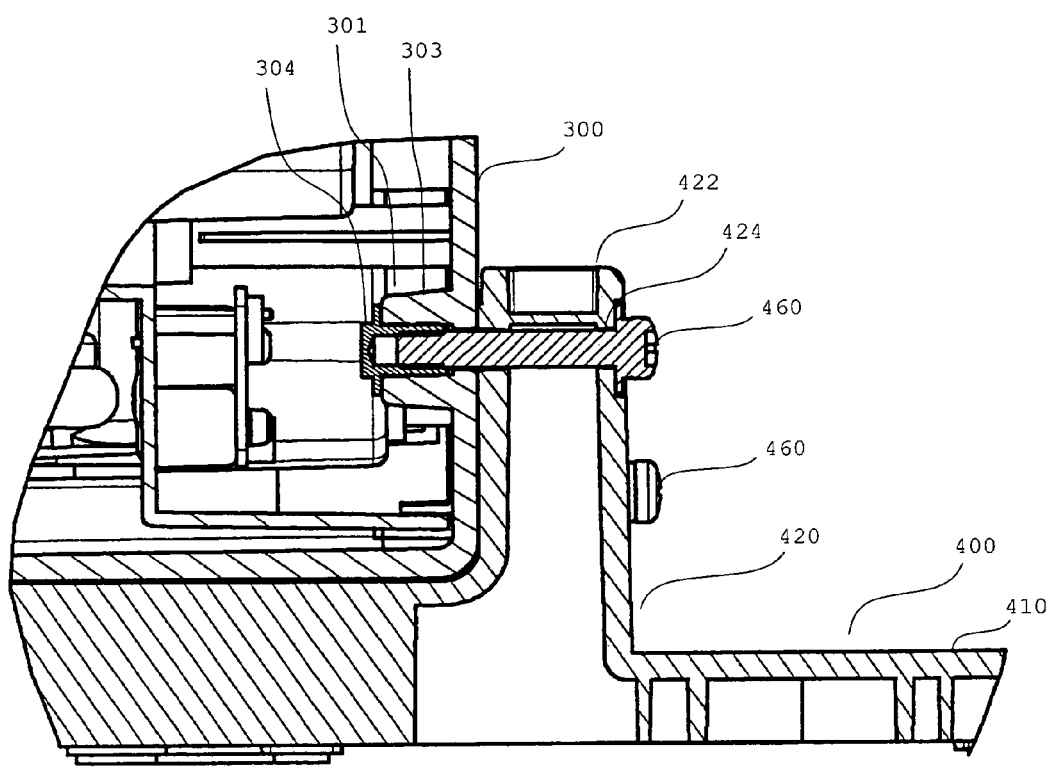
FIG. 18 is a cross-sectional view illustrating a junction of the projector and the stand according to the embodiment.
Figure 19:
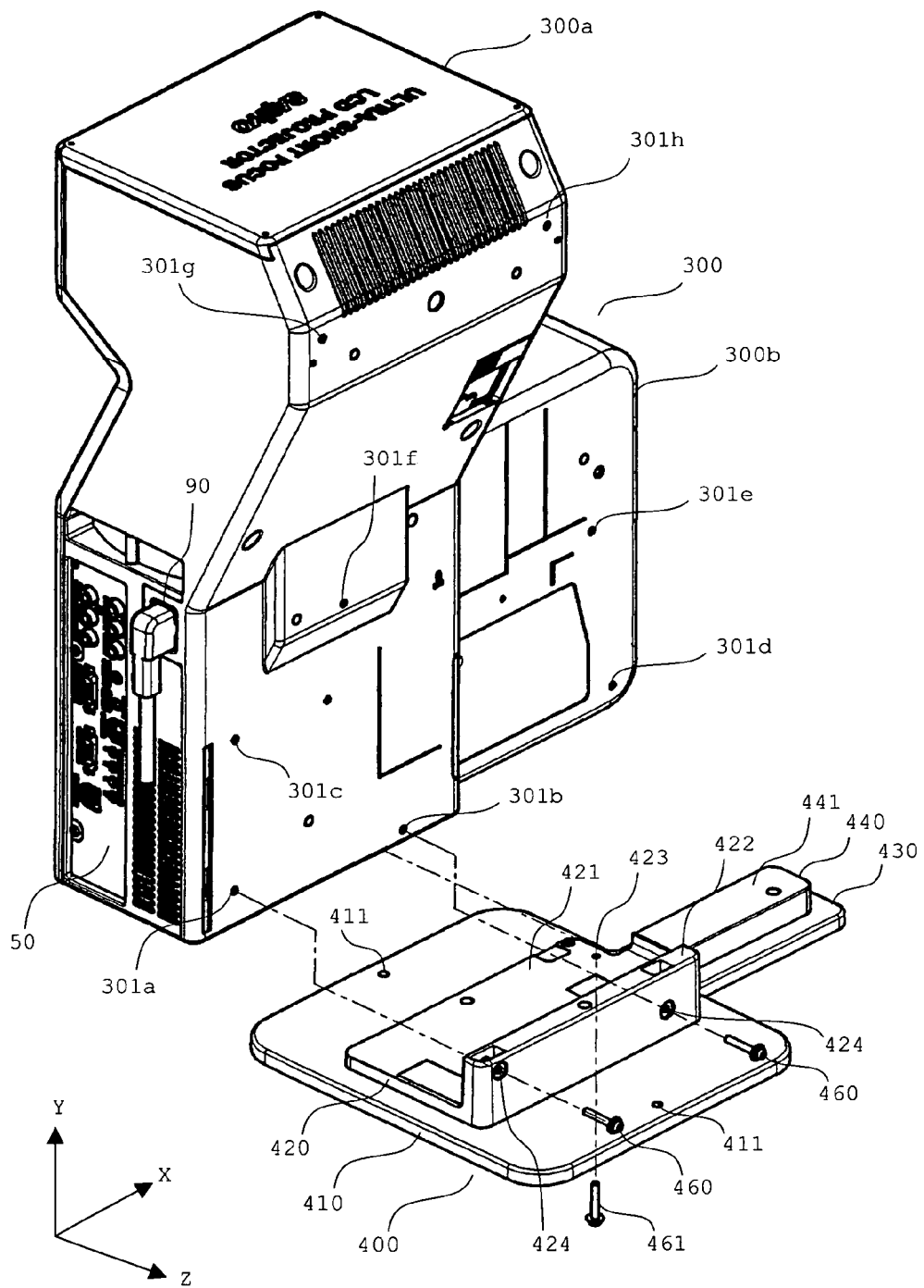
FIG. 19 is a perspective view illustrating a relationship between the projector and the stand according to the embodiment.
Figure 20:
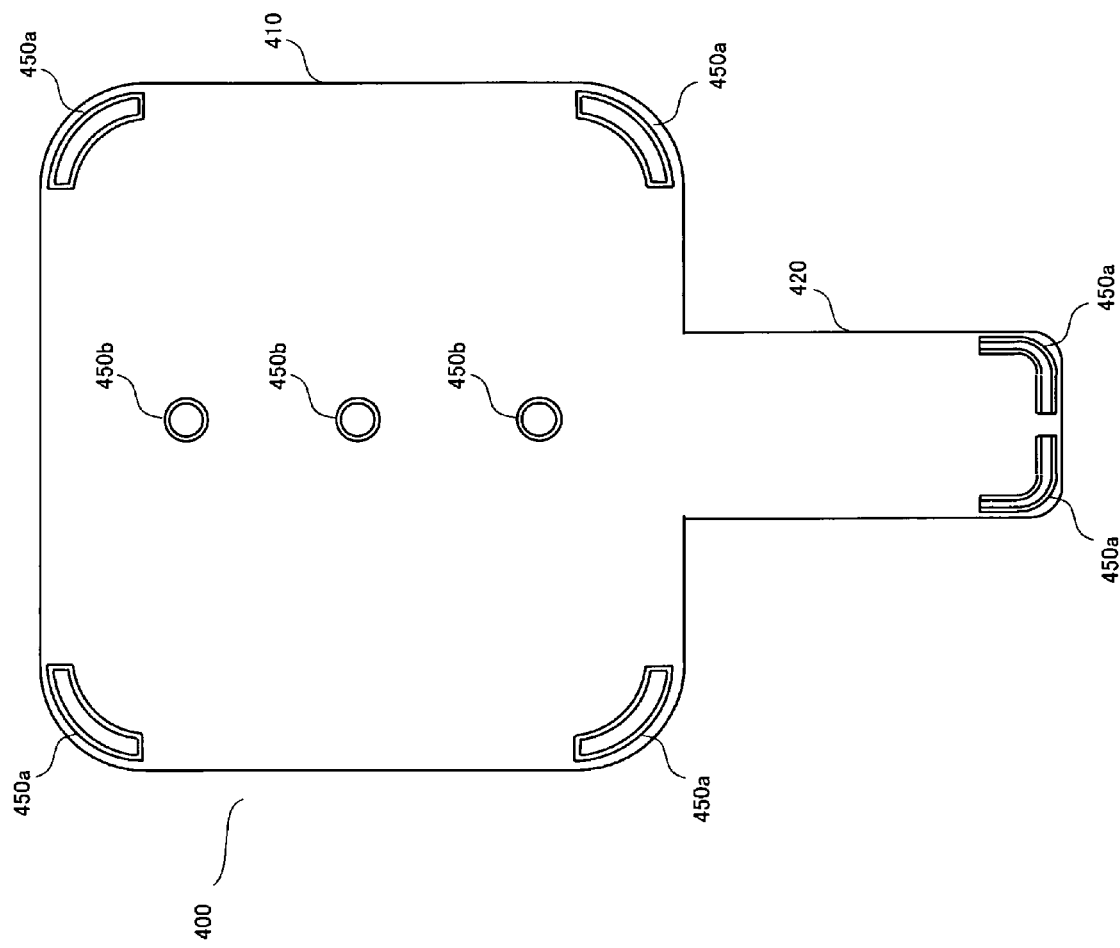
FIG. 20 is a perspective view schematically illustrating an underside of the stand according to the embodiment.

FIG. 15, FIG. 16, and FIG. 17 are diagrams illustrating a state that the projector according to the present embodiment is mounted on a desk top. FIG. 15 is a diagram observed from a right side of the projector, FIG. 16 is a diagram observed from a left side of the projector, and FIG. 17 is a diagram observed from a bottom side of the projector. Furthermore, FIG. 18 is an A-A' cross-sectional view of FIG. 17. FIG. 19 is an exploded perspective view of the projector and the stand. FIG. 20 is a diagram schematically illustrating a rear side of the stand.

According to the present invention, since a weight of the reflection mirror 204 is larger, when the projector is used by mounting on a desk, a position of the center of gravity of the projector becomes higher. For this reason, when the projector is used by mounting on the desk, there is a danger of overturn of the projector due to application of an unwanted force. In particular, as shown in FIG. 12, since the width D2 between the top face and bottom face of the cabinet 300 (width in the Z-axis direction) is comparatively small, overturn in the Z-axis direction poses a problem. Furthermore, since the reflection mirror 204 is disposed to be shifted in the direction opposite to the projection direction with regard to the optical axis of the projection lens unit 201, and the position of the center of gravity of the projector is shifted to the bottom face side of the cabinet 300, overturn easily occurs when a force to push the top face of the cabinet 300 (side surface of the light beam passing window 206) is applied.

Hence, according to the present embodiment, a stand 400 attachable to and detachable from the cabinet 300 is provided, and the cabinet 300 is designed to be mounted on the stand 400 when mounting on the desk, thereby suppressing overturn of the projector. According to the present embodiment, the portion of protrusion side cabinet 300b is lower in a height and lighter in a weight as compared to the portion of main body side cabinet 300a, the portion of protrusion side cabinet 300b hardly contributes to overturn of the projector. Therefore, the stand 400 has such a structure that overturn in the Z-axis direction with regard to the main body side cabinet 300a can be suppressed, as will be described later.

As shown in FIG. 19, the stand 400 (corresponding to a holding member of the present invention) comprises a first foundation 410 (corresponding to a protrusion section of the present invention), a first pedestal 420 (corresponding to a mounting section of the present invention), a second foundation 430, and a second pedestal 440. The first foundation 410, the first pedestal 420, the second foundation 430, and the second pedestal 440 are integrally formed of synthetic resins.

The first foundation 410 is formed to have an approximately square plate-like form. Two through-holes 411 are formed in a top face of the first foundation 410 so that the stand 400 can be threadably fixed to the mounting plane (on the desk), as necessary.

The first pedestal 420 is formed in a center part of the top face of the first foundation 410. The first pedestal 420 comprises a plane to be placed 421 on which the front face of the main body side cabinet 300a is placed, and a vertical wall section 422 for supporting a bottom face of the main body side cabinet 300a placed on the plane to be placed 421. One through-hole 423 is formed in the plane to be placed 421 for threading to the front face of the main body side cabinet 300a, and two through-holes 424 are formed in the vertical wall section 422 for threading to the bottom face of the main body side cabinet 300a.

The second foundation 430 is formed to have an approximately rectangle plate-like form. The second foundation 430 is formed continuously from the first foundation 410 in an X-direction so that the second foundation 430 may be disposed immediately underneath the protrusion side cabinet 300b when the main body side cabinet 300a is placed on the first pedestal 420. The second pedestal 440 is as the top face of the second foundation 430 and is formed continuously from the first pedestal 420 in the X-direction.

The second pedestal 440 has a plane to be placed 441 for placing the protrusion side cabinet 300b. Since a front face of the protrusion side cabinet 300b is slightly higher than the front face of the main body side cabinet 300a, the plane to be placed 441 of the second pedestal 440 is slightly higher than the plane to be placed 421 of the first pedestal 420, accordingly.

On the underside of the stand 400, as shown in FIG. 20, rubber pads 450a are provided to six locations in total for each of corners of the first foundation 410 and the second foundation 430, and a rubber pad 450b is provided in a center part of the first foundation 410. These rubber pads 450a and 450b prevent slip between the stand 400 and the mounting plane, and at the same time, scars on the mounting plane can be prevented.

Screw holes 301a through 301h are formed in the bottom face of the cabinet 300. Of these screw holes 301a through 301h, two screw holes 301a and 301b are used for fixing the cabinet 300 to the stand 400. Furthermore, as shown in FIG. 13, in the front face of the cabinet 300 is provided a screw hole 302 for fixing the cabinet 300 to the stand 400.

When the cabinet 300 (projector main body) is mounted on the stand 400, the cabinet 300 is disposed on the stand 400 so that the front face of the main body side cabinet 300a and the front face of the protrusion side cabinet 300b may be respectively placed on the first pedestal 420 and the second pedestal 440. Then, the screw holes 301a and 301b in the bottom face of the cabinet 300 align with the through-hole 424 of the vertical wall section 422, and the screw hole 302 in the front face align with the through-hole 423 in the plane to be placed 421. Therefore, in this state, screws 460 are threaded into the screw holes 301a and 301b, and a screw 461 is threaded into the screw hole 302, to secure the cabinet 300 to the stand 400.

As shown in FIG. 18, the screw hole 301a has an insert nut in which a nut 304 made of a metal is inserted into a boss hole 303. Similarly, other screw holes 301b through 301h, and 302 also have the insert nut.

As shown in FIG. 17, the first foundation 410 is designed in such that a width W1 in a direction of an X-axis is approximately equal to a width D4 of the main body side cabinet 300a in the direction of the X-axis. On the other hand, as shown in FIG. 15, a width W2 of the first foundation 410 in a direction of a Z-axis is made sufficiently large as compared to a width D2 of the main body side cabinet 300a in the direction of the Z-axis. That is, according to the present embodiment, the first foundation 410 is sufficiently projected in the Z-axis direction compared to the top face of the main body side cabinet 300a and is sufficiently projected in the Z-axis direction compared to the bottom face of the cabinet 300. Therefore, overturn of the cabinet 300 to the top face side and to the bottom face side is suppressed.

Furthermore, a height L of the cabinet 300 when the cabinet 300 is placed on the stand 400, shown in FIG. 15, is set in such that a size of the screen projected from the light beam passing window 206 to the mounting plane (desk top) may become a round number, e.g., 70 inches. Since the stand 400 has adjusting function of the screen size as mentioned, a dimension and form of the cabinet 300 are not restricted by adjustments of the screen size when mounting on the desk, thereby preventing increase in burdens imposed on cabinet designing.

Furthermore, according to the present embodiment, as mentioned above, since the center of the gravity of the projector is shifted to the bottom face side of the cabinet 300, the projector easily overturns to the bottom face side of the cabinet 300. Then, according to the present embodiment, the vertical wall section 422 is provided on the first pedestal 420.

The width W3 of the vertical wall section 422 in the X-axis direction is, as shown in FIG. 17, slightly shorter than the width D4 of the main body side cabinet 300a in the X-axis direction, and the bottom face of the main body side cabinet 300a is wholly supported in the X-axis direction by the vertical wall section 422. Furthermore, according to the present embodiment, the front face of the main body side cabinet 300a and the plane to be placed 421 are threaded in a Y-axis direction, and in addition, the bottom face of the main body side cabinet 300a and the vertical wall section 422 are threaded in the Z-axis direction. In this way, according to the present embodiment, support against overturn to the bottom face of the cabinet 300 is made robust and therefore, the projector can be supported in a stable manner and prevention of overturn is greatly enhanced.

Moreover, as mentioned previously, since portion of the protrusion side cabinet 300b does not significantly contribute to overturn of the projector, support of the protrusion side cabinet 300b in the Z-axis direction by the second foundation 430 and the second pedestal 440 is unnecessary, and therefore, these members are designed to merely receive the front face of the protrusion side cabinet 300b. Accordingly, in the present embodiment, as shown in FIG. 16 and FIG. 17, the second pedestal 430 and the second foundation 440 are formed so as to be accommodated within the front face of the protrusion side cabinet 300b. For this reason, in a state where the projector is mounted on the plane to be placed of the stand 400, the second foundation 430 and the second pedestal 440 are hidden by the protrusion side cabinet 300b and are less visible. Therefore, the stand 400 can be made unnoticeable as much as possible, and the projector looks better.

Furthermore, according to the present embodiment, since the screw holes 301a and 301b for mounting the stand 400 are commonly used as screw holes for stationary type and as screw holes for ceiling mount type of the projector, the space in bottom face of the cabinet 300 can be effectively used.

Figure 21:
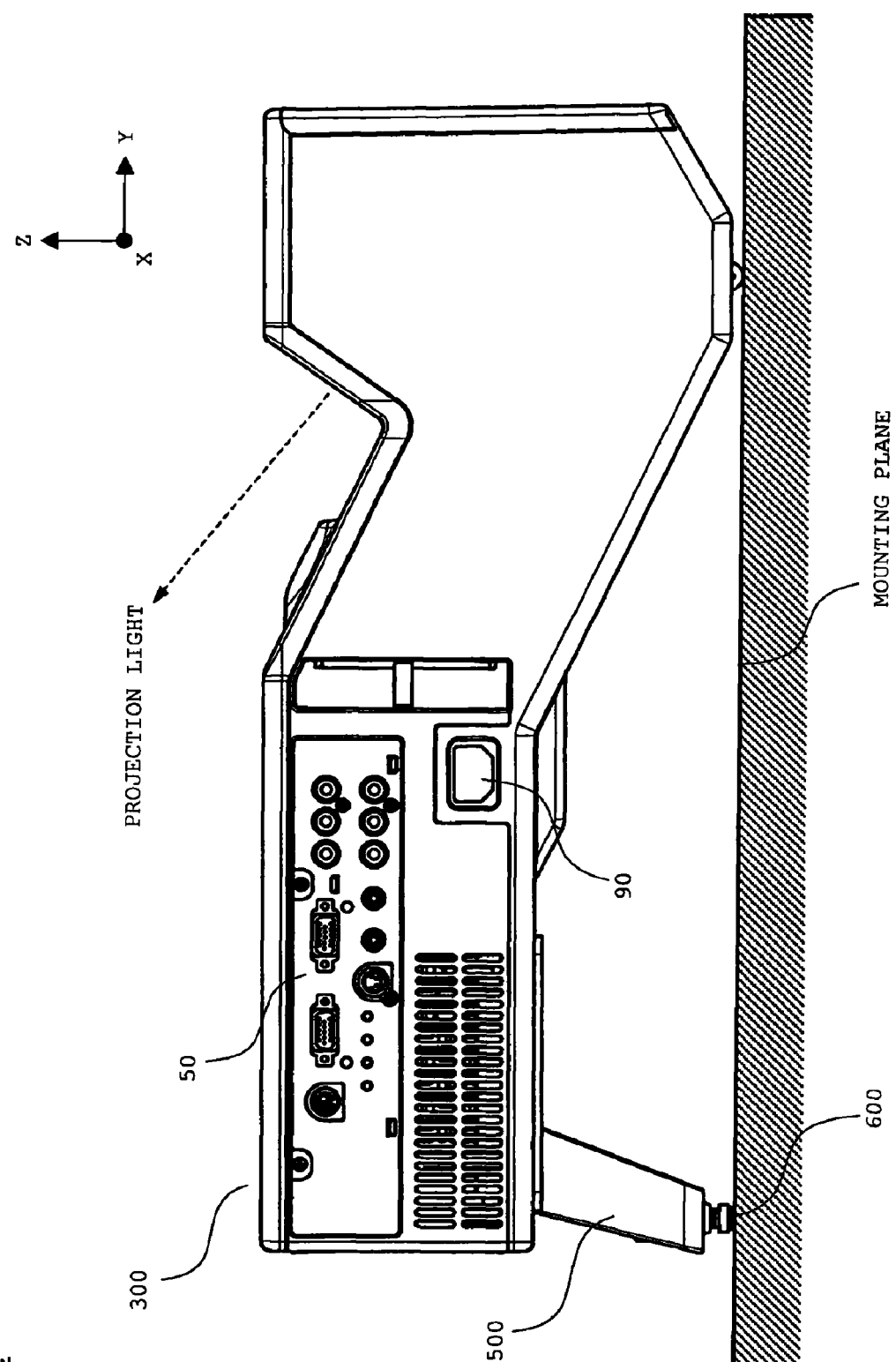
FIG. 21 is a right side view illustrating an external appearance of the projector equipped with an arm member according to the embodiment.
Figure 22:
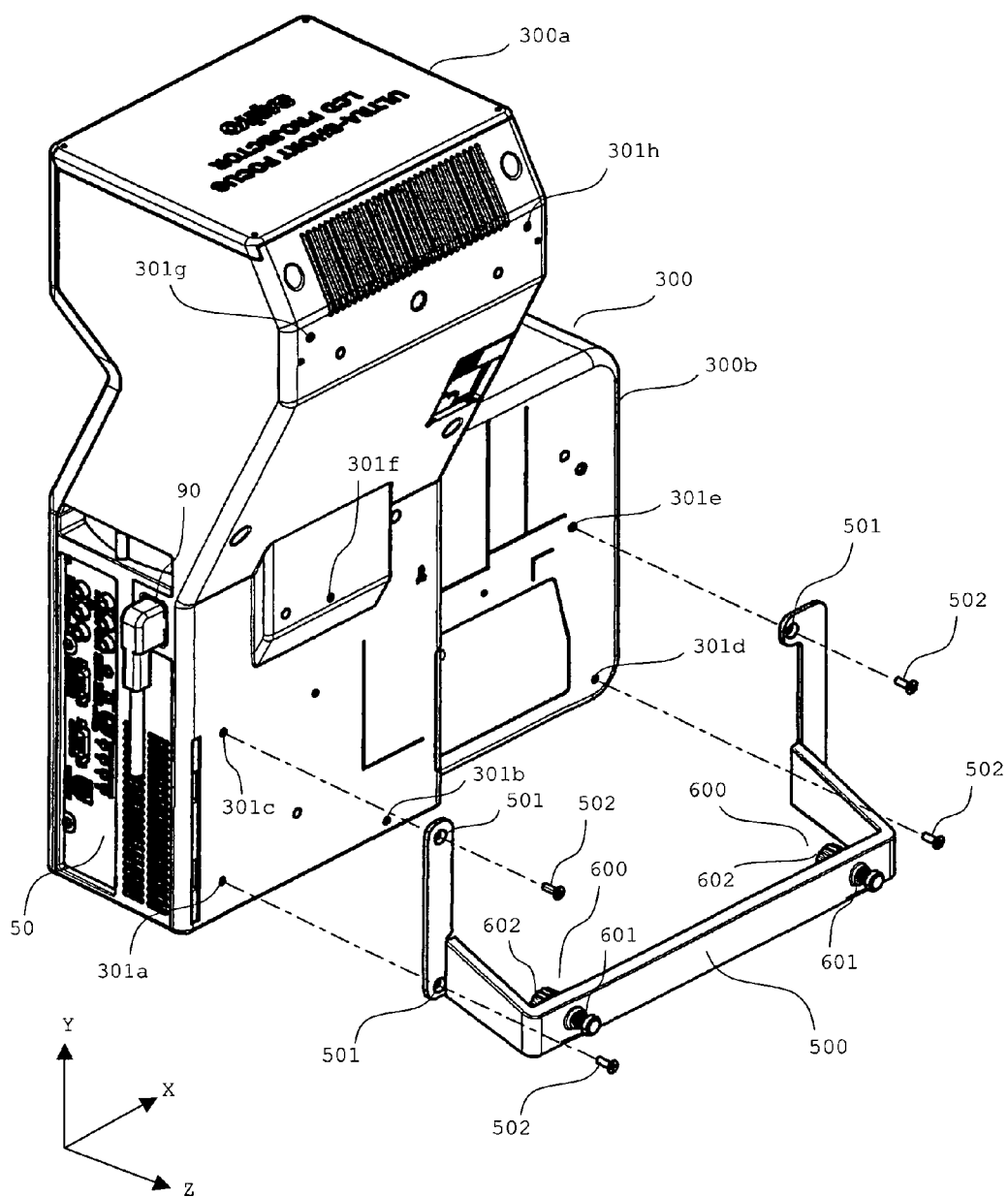
FIG. 22 is a perspective view illustrating a relationship between the projector and the arm member according to the embodiment.

FIG. 21 is a diagram illustrating stationary type of the projector and FIG. 22 is an exploded perspective view of the projector and an arm member according to the present invention.

In a case the projector is used in a form of stationary type, in order to correct a level difference (amount of protrusion D1 shown in FIG. 12) caused by protrusion of a portion of the mirror cover 205, an arm member 500 is attached to the bottom face of the cabinet 300. When the arm member 500 is attached, the stand 400 is removed.

In the arm member 500, two adjusting screws 600 are provided so that end portions thereof may penetrate through the arm member 500. In addition, in the arm member 500 are formed four holes 501 for threading the arm member 500 to the bottom face of the cabinet.

The arm member 500 is attached in such that, among the above-mentioned screw holes 301a through 301h formed in the bottom face of the cabinet 300, four holes 501 are aligned with the four screw holes 301a, 301c through 301e, and in this state, screws 502 are threaded into the screw holes 301a, 301c through 301e. On this occasion, one screw hole 301a for mounting the stand 400 is commonly used for attaching the arm member 500.

The adjusting screws 600 are configured such that an adjusting dial 602 is attached to a screw member 601. By turning the adjusting dial 602, an amount of protrusion of the screw member 601 from the bottom face of the arm member 500 varies. In this way, in a state of stationary type of the projector, a tilt of the projector can be adjusted by appropriately turning the two adjusting screws 600.

When the projector is used in a form ceiling mount type as shown in FIG. 14(a), the cabinet 300 is threaded to a holding mechanism for ceiling mount type using the five screw holes 301a, 301b, 301f through 301h, while the stand 400 and the arm member 500 are removed. On this occasion, the two screw holes 301a and 301b for attaching the stand 400 are commonly used for attaching the holding mechanism.

In this way, according to the present embodiment, since the screw holes 301a and 301b for attaching the stand 400 are commonly used as the screw holes for attaching the arm member 500 and as the screw holes for ceiling mount type, the space in the bottom face of the cabinet 300 can be effectively used.

While the embodiment of the present invention has been described as described above, the present invention is not limited by above-mentioned embodiment. It should be understood that various other modifications and variations may be made to the embodiment of the present invention.

For example, projector overturn prevention means may be provided in the projector main body in an integrated fashion instead of using a separate member. The following description will deal with examples of other arrangements.

FIG. 23 shows an example of an arrangement for preventing overturn in a case where a side surface of the light beam passing window 206 side is pressed. The arrangement used in this example is such that a stand 81 for preventing overturn is protruded from a side surface on a side opposite to the light beam passing window 206.

The stand 81 includes a bar-shaped member and an end portion thereof is exposed outwardly from a hole 82 formed at a side surface of the main body cabinet. The stand 81 is supported in the main body cabinet by a mechanism that one push of the stand 81 allows the end portion of the stand 81 to be outwardly exposed and subsequently the stand 81 to be withdrawn to a predetermined position. When the stand 81 is used, the end portion thereof is pushed once, and then, the stand 81 is protruded from the main body cabinet. Following this, the stand 81 is withdrawn from the main body cabinet up to a predetermined position.

Figure 24B:
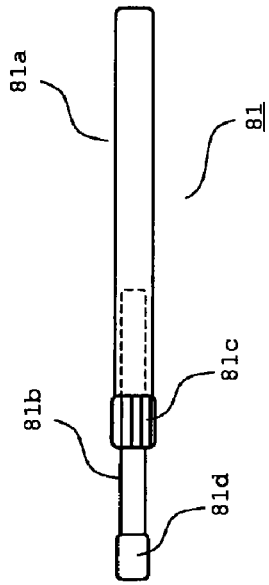
FIG. 24B is a diagram illustrating an example showing that a length of the stand is adjustable, according to the example of the other arrangement.
Figure 24C:
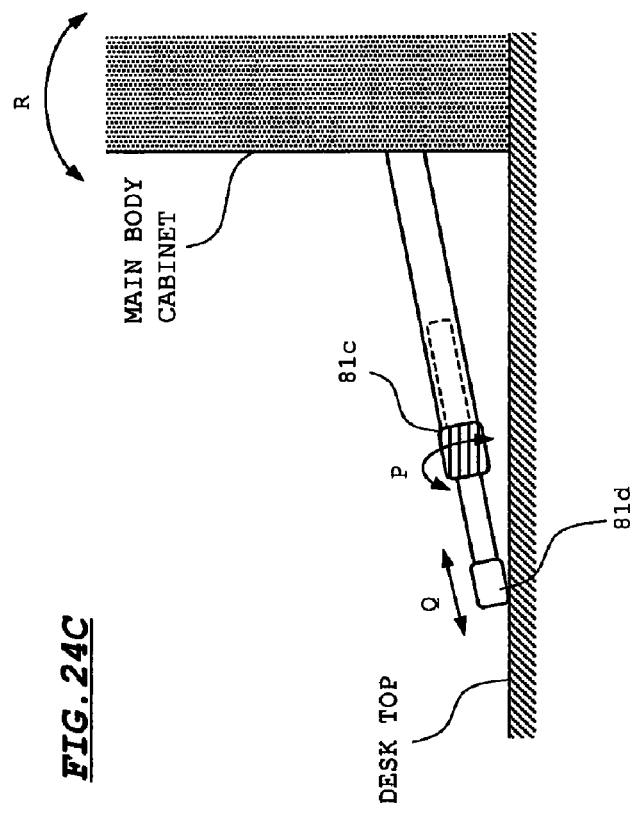
FIG. 24C is a diagram illustrating a state in use of the stand shown in FIG. 24B.
Figure 24A:
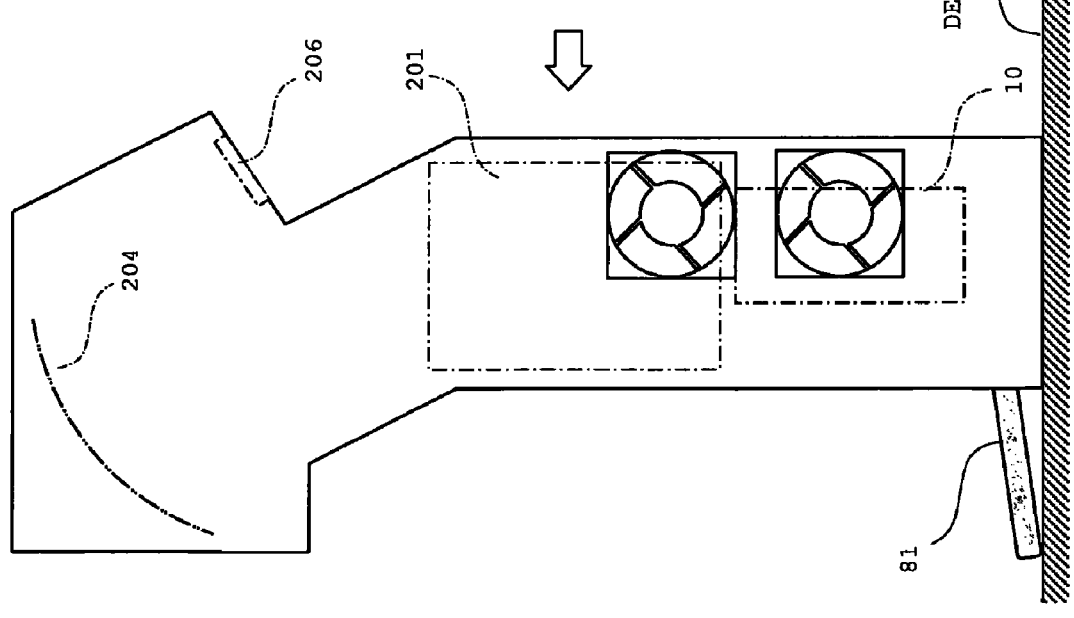
FIG. 24A is a diagram illustrating a state in use of the stand according to the example of the other arrangement.

FIG. 24A is a diagram illustrating a state in use of the stand 81. In this case, when a force is applied in a direction of an arrow, the stand 81 acts as a stopper, thereby preventing overturn of the projector.

Furthermore, by making a length of the stand 81 adjustable, adjustment of the tilt of the projector can be made in addition to prevention of overturn. With an arrangement as in the present embodiment where the light is enlarged and projected by the reflection mirror 204, strict view angle adjustment and focus adjustment of the projected image is necessary. In other words, a slight alteration of the tilt in the Z-axis direction of FIG. 23A results in a greater shift of a projection region on the screen and in a significant change in a focus state of the projected image. Therefore, when a tilting state of the projector in the Z-axis direction can be finely adjusted by finely adjusting a length of the stand 81, the stand 81 can embody functions such as view angle adjustment and focus adjustment of the projected image as well as prevention of overturn.

FIG. 24B is an example of an arrangement of the stand 81 capable of adjusting the length. In this example of the arrangement, a shaft 81*b* is inserted into a cylindrical body 81*a* in a slidable state. The shaft 81*b* and an adjusting dial 81*c* are linked by a linking mechanism and when the adjusting dial 81*c* is turned in a circumferential direction of the cylindrical body 81*a*, the shaft 81*b* displaces in a longitudinal direction along with the cylindrical body 81*a*. Therefore, appropriate turning of the adjusting dial 81*c* enables change in a length of the stand 81. A rubber pad 81*d* is provided on an end portion of the shaft 81*b*.

FIG. 24C shows an example where the stand 81 shown in FIG. 24B is disposed to the projector. When the adjusting dial 81*c* is turned in a direction of an arrow P, the shaft 81*b* displaces in a direction of an arrow Q. Here, since the shaft 81*b* is tilted with regard to the desk plane, displacement of the shaft 81 in the direction of the arrow Q causes a tilt of the main body cabinet in a direction of an arrow R depending on the displacement. With this movement, a tilt of the projector in the Z-axis direction in FIG. 23A is adjusted.

In the above-shown embodiment, a thickness of the projector in the Z-axis direction is small, and therefore, when the stand 81 is accommodated in the main body cabinet as shown, increase in the length of the stand 81 is impossible.

Figure 25:
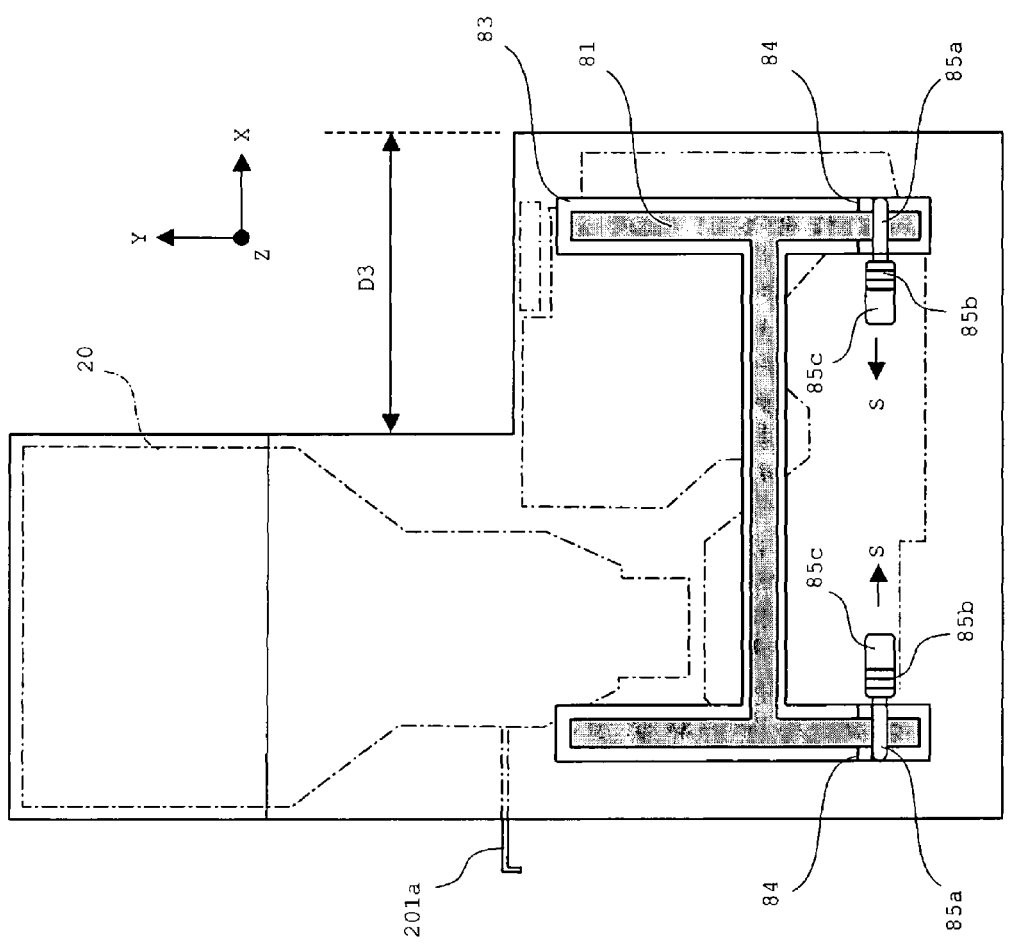
FIG. 25 is a diagram illustrating an example of another arrangement of the stand according to the embodiment.
Figure 26B:
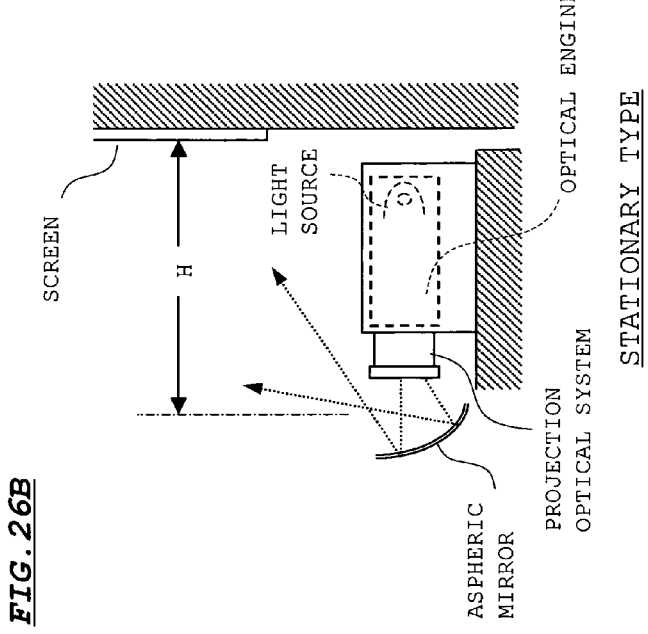
FIG. 26B is a diagram illustrating a state in use (stationary type) of the projector of the type for enlarging and projecting by a mirror.
Figure 26A:
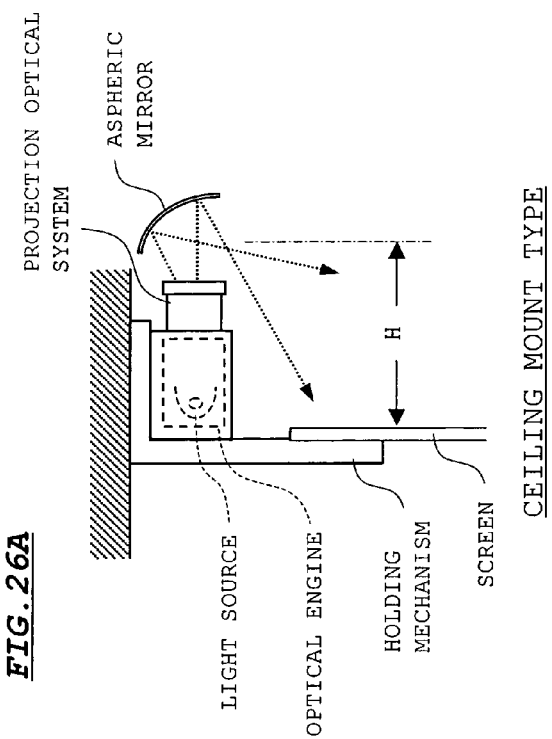
FIG. 26A is a diagram illustrating state in use (ceiling mount type) of a projector of a type for enlarging and projecting by a mirror.
Figure 26C:
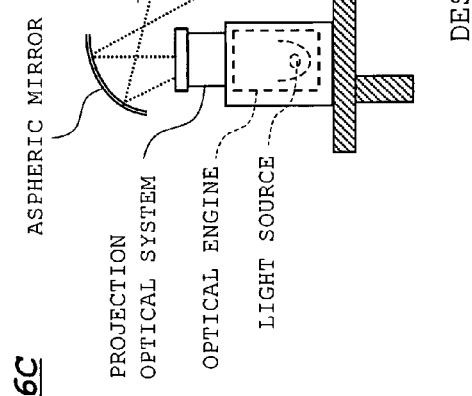
FIG. 26C is a diagram illustrating a state in use (desk mount type) of the projector of the type for enlarging and projecting by a mirror.

FIG. 25 shows an example of an arrangement where the length of the stand 81 is increased. Here, the stand 81 has an H-shape and is accommodated in a H-shaped groove formed in the main body cabinet. The stand 81 is rotatably supported by a spindle 84, and when accommodated, a front face of the stand 81 abuts a stopper 85*a*. When a slide 85*b* is displaced in a direction of an arrow S along with a guide 85*c*, the abutting state of the stopper 85*a* with regard to the stand 81 can be released. In this state, the stand 81 is rotated to a predetermined position and then, the slide 85*b* is reset to a locked state shown in FIG. 18. With this operation, the stopper 85*a* abuts the stand 81 in a state that the stopper 85*a* downwardly presses the stand 81 in the figure, and the stand 81 is locked in a state for use.

Also in this example of the arrangement, a length adjustable stand as shown in FIG. 24B may be used as the stand 81. Besides, a stand may also be disposed to the side surface of the light beam passing window 206 together with the stand 81 shown in FIG. 25 for further preventing the projector from overturning to the light beam passing window 206 side. In this case, the stand to be disposed to the side surface of the light beam passing window 206 side may be a one-push type stand as shown in FIG. 23. Alternatively, a length adjustable stand may be used for the stand to be disposed to the side surface of the light beam passing window 206 to adjust a tilt of the projector.

What is claimed is:

1. A projection display device, comprising:
    a projection lens section to which light modulated by a light modulating element is entered;
    a mirror section that reflects light transmitted through the projection lens section and directs the light to a projection plane;
    a cabinet that houses the projection lens section and the mirror section; and
    a holding member including a planar mounting section having a size corresponding to a size of a side surface of the cabinet and on which the side surface of the cabinet is positioned and mounted, and including a protruding section that protrudes in a lateral direction with respect to the planar mounting section, the protruding section extending laterally beyond the planar mounting section on which the side surface of the cabinet is positioned and mounted,
    wherein respective undersides of the planar mounting section and the protruding section of the holding member contact a mounting plane on which the cabinet is mounted, and the holding member holds the cabinet in an upright state with respect to the mounting plane such that the mirror section is positioned at an upper part of the cabinet and the light that exits the projection lens section exits in a direction away from the mounting plane.

2. The projection display device according to claim 1, wherein
    the holding member can be mounted on and removed from the cabinet, and the holding member comprising a mounting section on which the cabinet is mounted, and a projection section that projects in a lateral direction compared to a side surface of the cabinet mounted on the mounting section and suppresses a tilt of the cabinet.

3. The projection display device according to claim 2, wherein
    the mirror section is disposed to be shifted from an optical axis of the projection lens section in a direction intersecting orthogonal to the optical axis of the projection lens section, and
    the mounting section comprises a plane to be placed on which the cabinet is placed, and a vertical wall section for supporting the side surface of the cabinet on a side where the mirror section is shifted when the cabinet is placed to the plane to be placed.

4. The projection display device according to claim 2, wherein
    the cabinet is threadably mounted on the mounting section with a screw, and a screw hole formed in the cabinet are commonly used as a screw hole for mounting the cabinet in other mounting configuration.

5. A stand used for a projection display device, the projection display device comprising a projection lens section to which light modulated by a light modulating element is entered, a mirror section that reflects the light transmitted through the projection lens section and directs the light to the projection plane and a cabinet that houses the projection lens section and the mirror section, the stand comprising:
- a mounting section including a plane having a size corresponding to a size of a side surface of the cabinet on which the side surface of the cabinet is positioned and mounted; and
- a projection section that projects in a lateral direction with respect to the plane on which the side surface of the cabinet is mounted to suppress tilt of the cabinet, the projection section extending laterally beyond the plane on which the side surface of the cabinet is positioned and mounted, and
- wherein respective undersides of the mounting section and the projection section contact a mounting plane on which the cabinet is mounted, and the stand holds the cabinet in an upright state with respect to the mounting plane such that the mirror section is positioned at an upper part of the cabinet and the light that exits the projection lens section exits in a direction away from the mounting plane.

6. The stand used for the projection display device according to claim 5, wherein
- the mirror section is disposed to be shifted from an optical axis of the projection lens section in a direction intersecting orthogonal to the optical axis of the projection lens section, and
- the mounting section comprises a plane to be placed on which the cabinet is placed, and a vertical wall section for supporting a side surface of the cabinet on a side where the mirror section is shifted when the cabinet is placed to the plane to be placed.

7. The stand for the projection display device according to claim 5, wherein
- the mounting section is secured to the cabinet with a screw, and
- a hole formed in the mounting section for threading are formed at a position which align with a position of a screw hole formed in the cabinet, the screw hole formed in the main body is commonly used for mounting of the cabinet in other mounting configuration.

* * * * *